US009816831B2

United States Patent
Fischer et al.

(10) Patent No.: US 9,816,831 B2
(45) Date of Patent: Nov. 14, 2017

(54) METHODS AND SYSTEMS FOR RECONSTRUCTING TRACKS USING ELECTRONIC MAP DATA

(71) Applicant: TomTom Navigation B.V., Amsterdam (NL)

(72) Inventors: Johannes Robert Fischer, Berlin (DE); Jan-Ole Sasse, Berlin (DE); Sven Grothklags, Berlin (DE)

(73) Assignee: TomTom Navigation B.V., Amsterdam (NL)

( * ) Notice: Subject to any disclaimer, the term of this patent is extended or adjusted under 35 U.S.C. 154(b) by 0 days.

(21) Appl. No.: 14/931,972

(22) Filed: Nov. 4, 2015

(65) Prior Publication Data
US 2017/0082453 A1    Mar. 23, 2017

(30) Foreign Application Priority Data
Sep. 21, 2015 (EP) .................... 15186139

(51) Int. Cl.
*G01C 21/36* (2006.01)
*G01C 21/30* (2006.01)

(52) U.S. Cl.
CPC ......... *G01C 21/3667* (2013.01); *G01C 21/30* (2013.01); *G01C 21/3626* (2013.01)

(58) Field of Classification Search
CPC ............ G01C 21/3667; G01C 21/3415; G01C 21/165; G01C 21/367; G01C 21/3682; G01C 21/3626; G01C 21/005; G01C 21/36; G06Q 30/02; G06T 11/203
See application file for complete search history.

(56) References Cited

U.S. PATENT DOCUMENTS

| | | | | |
|---|---|---|---|---|
| 6,965,827 B1 * | 11/2005 | Wolfson | ............ | G01C 21/3415 340/992 |
| 7,873,471 B2 * | 1/2011 | Gieseke | ............ | G01C 21/3415 340/995.12 |
| 9,212,914 B2 * | 12/2015 | Kolar | .................. | G01C 21/165 |
| 2004/0030495 A1 * | 2/2004 | Draeger | ............ | G01C 21/3415 701/411 |
| 2006/0212217 A1 * | 9/2006 | Sheha | .................. | G01C 21/005 701/412 |
| 2007/0229513 A1 * | 10/2007 | Bowman | ............ | G01C 21/367 345/467 |
| 2008/0253688 A1 | 10/2008 | Safra et al. | | |

(Continued)

FOREIGN PATENT DOCUMENTS

WO    2015132407 A2    9/2015

*Primary Examiner* — Yuri Kan

(57) ABSTRACT

A method and system for generating a route reconstructing a track through a navigable network in an area covered by an electronic map is disclosed, wherein the track is represented by an ordered series of point locations. One or more of the point locations are selected and an area is defined and associated with each of the one or more selected point locations. The ordered series of point locations and the defined areas are used to determine a plurality of polylines, and, for each of the polylines, a first route is generated based on the respective polyline. A second route is generated through each of the defined areas connecting the respective first generated routes. The route reconstructing the track comprises the generated first routes and the one or more generated second routes.

19 Claims, 9 Drawing Sheets

(56) References Cited

U.S. PATENT DOCUMENTS

| | | | |
|---|---|---|---|
| 2009/0326799 A1* | 12/2009 | Crook | G06Q 30/02 701/533 |
| 2013/0321422 A1* | 12/2013 | Pahwa | G06L 11/203 345/428 |
| 2015/0057930 A1* | 2/2015 | Kolar | G01C 21/165 701/532 |
| 2015/0338220 A1* | 11/2015 | Choi | G01C 21/36 701/537 |
| 2016/0069699 A1* | 3/2016 | Chen | G01C 21/3682 701/426 |

* cited by examiner

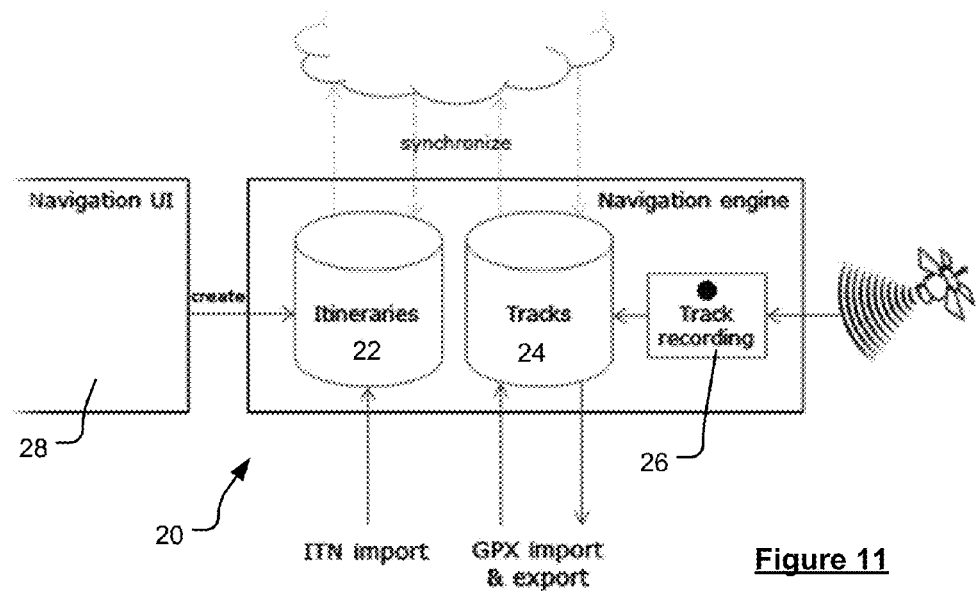
Figure 11
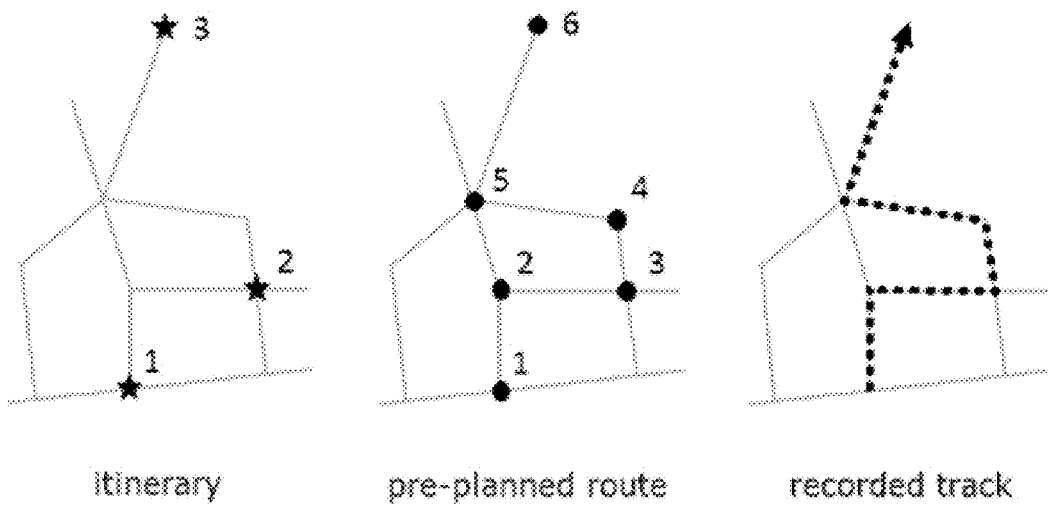
| Itinerary | pre-planned route | recorded track |
| --- | --- | --- |
| Figure 12A | Figure 12B | Figure 12C |

METHODS AND SYSTEMS FOR RECONSTRUCTING TRACKS USING ELECTRONIC MAP DATA

CROSS REFERENCE TO RELATED APPLICATIONS

This application claims the benefit of European Patent Application No. 15186139.0 filed Sep. 21, 2015. The entire content of this application is incorporated herein by reference.

FIELD OF THE INVENTION

This invention relates to methods and systems for generating routes through a navigable network in relation to an electronic map representing the navigable network, and also extends to navigation devices arranged to generate such routes. The invention is applicable to the generation of a route that occurs in order to reconstruct a track through the navigable network in relation to the electronic map. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning functionality, and preferably also navigation functionality.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "freedriving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

More recently it has been recognised that there may be some drawbacks associated with arrangements in which a navigation device generates routes independently, in a standalone manner. Often users do not update the electronic map data of the navigation device regularly, which may prevent optimal routes from being generated by the device. Furthermore, the storage and processing capacity of such devices is inherently limited, which may constrain the route generation process, and limit the amount of information that the device is able to provide in relation to the generated route. For example, the device may not be able to provide additional non-core information that may be of interest to the user in relation to the route, such as audio street name prompts.

One alternative approach to generating routes is for all electronic map data and routing functionality to be provided at a server on behalf of client navigation devices. A navigation device will then submit a request for a route to a server. The server generates the route on behalf of the device, and transmits it to the device, in some cases together with the electronic map data that will be required by the device in order to use the route. This may overcome some of the problems associated with systems in which the route generation is carried out entirely by a navigation device. For example, a server may have access to up to date electronic map data, and will have the processing and storage capability to carry out more complex routing processes. The server may provide more detailed route data to the navigation device, allowing the device to use such data without needing to store more detailed electronic map data itself. However, relying entirely upon a server to provide routing functionality in this way may be problematic. For example, when a navigation device is unable to establish communication with the server, route generation will not be possible. Difficulties are compounded in arrangements which also rely upon the navigation device being able to communicate with the server in order to obtain map data.

In order to address certain of these problems, it has been recognised that rather than having route generation occur entirely at either a navigation device or server, it may be advantageous for route generation to be carried out in part by the navigation device, and in part by a server in communication therewith. This type of system is known as a "hybrid" routing system. In these arrangements, both the server and navigation device have access to electronic map data. A navigation device may provide details of an origin, whether a current position or user specified position, and a destination for a desired route to the server, and request that the server generates a route between the origin and destination. The server may then generate the route in relation to its own electronic map data. As the server will have greater processing power and storage capacity than a client navigation device, it may employ more complex routing processes. Furthermore, the server may have access to more up to date and comprehensive electronic map data. The electronic map data may be customised in a proprietary manner. For example, a server may generate a route using electronic map data from a vehicle manufacturer that incorporates point of interest data that is considered to be relevant to users of their vehicles.

Once the route is generated, the server transmits the route to the client navigation device that requested the route. Thus, the route generation occurs off-board, i.e. external to the navigation device. Before the client navigation device can use the received route, e.g. to provide navigation instructions and/or display the route, it must carry out an operation to reconstruct the received route in relation to its own local electronic map data. This is because the received route may not be in the same format that is required by the navigation device, and it will generally not have been generated in relation to the same electronic map data that is held by the navigation device. It is necessary to match locations associated with the generated route to locations in the local electronic map of the device. For example, a server may provide generated route information to client devices in a generic format, from which the individual devices may then reconstruct routes in the manner required for compatibility with their own specific electronic map data.

It will be seen that such hybrid routing systems may retain some of the benefits associated with route generation solely at either a navigation device or server, while mitigating some of the drawbacks of those systems. Examples of hybrid routing systems are described in WO 2007/079042 A2, entitled "Intelligent Location Based Services and Navigation Hybrid System", and WO 00/40930 A1 entitled "Mobile Navigation System".

There are some challenges involved in implementing hybrid routing systems. One particular problem is concerned with the reconstruction of received routes by a client navigation device. In order to do this, the navigation device needs to be able to correlate data indicative locations to be included in the route which is received from the server with locations represented by its own electronic map data.

Various techniques have been proposed that are intended to allow a navigation device to reconstruct a route received from a server without requiring the server to generate the route in relation to the same electronic map that is used by the device. One such technique involves the server transmitting a generated route in the form of a list of waypoints. The navigation device then correlates the waypoints with locations represented by its electronic map, and constructs a route that passes through the waypoints. However, such methods may be inefficient in that in order to accurately describe a generated route, a large number of waypoints may be needed. Furthermore, there may be difficulties in matching received waypoints to locations in the local electronic map of the navigation device, particularly where the device map data is of significantly lower quality or resolution than the server map data. For example, the server may transmit the coordinates of a waypoint. However, these coordinates may correlate to a different position in the device map than in the server map.

One way to try to avoid problems arising due to differences between server and device electronic maps, is to use map agnostic location referencing. The server may generate a route in relation to its electronic map data, and convert the route information, e.g. waypoints into a map agnostic form for transmission to a navigation device. This may be carried out by encoding the locations, e.g. of waypoints in accordance with a map agnostic location referencing system. The device may receive the encoded location information, and decode the information to obtain a location in its own electronic map that corresponds to the location in the server's electronic map that was originally encoded. Examples of such map agnostic systems include AGORA-C, OpenLR™ and TPEG-ULR. These techniques typically encode the route (or line location) as a set of location points, specified by coordinate pairs of latitude and longitude, and ordered in a list; the location points each being provided with one or more additional attributes (typically derived from the electronic map data) that can assist in better defining the location when decoding the line location on a different electronic map.

In addition to any difficulty with map matching, one further drawback with the existing hybrid routing systems is that when reconstructing the received route, the navigation device attempts to recreate, i.e. replicate the route generated by the server. The navigation device does not have the latitude to modify the route, e.g. if live data available to the device suggests that an alternative to at least a portion of the route may be preferable. For example, the device may have access to live traffic information that indicates that a part of the route is affected by a jam.

One technique which has been proposed to allow the reconstruction of a route by a navigation device with respect to an electronic map of the device, where the route has been generated off-board from the device, such as by a server, involves the use of a polyline. These polyline based route reconstruction techniques are described in WO 2015/132407 A2; the entire content of which is incorporated herein by reference. A polyline comprises a series of points connected by one or more line segments. A polyline is generated, which provides an approximation of the route to be reconstructed. The polyline is then used in reconstructing the route by reference to the electronic map used by the navigation device. A route may be generated in relation to the electronic map which follows the polyline as far as possible. The use of the polyline enables a route to be reconstructed with respect to the applicable electronic map based on route data which refers to a different electronic map, or which is not with reference to an electronic map at all, e.g. being positional data, e.g. an ordered list of geographic positions (such as pairs of latitude and longitude coordinates). The polyline provides an overall approximation of the shape of the route to be reconstructed, but in a map agnostic manner, such that the routing process is free to generate a route with respect to the electronic map which follows the shape of the polyline, to the extent this is possible, given the actual position of segments of the navigable network represented by the electronic map. The reconstructed route may be generated taking into account live data, and is not constrained to include particular segments.

In addition to hybrid routing type applications, in which a track in the form of a pre-planned route is reconstructed with respect to an electronic map, there are other situations in which it may be desirable to be able to reconstruct an existing track with respect to an electronic map. For example, the track might be a previously travelled route, which may be described in terms of positional data with respect to time. In yet other scenarios, it is envisaged that the track might be in the form of an itinerary. WO 2015/132407 A2 describes the application of polyline type route reconstruction to pre-planned routes, or previously travelled routes, e.g. as described by positional data.

The Applicant has realised that while polyline based approaches as described in WO 2015/132407 A2 may be useful in reconstructing certain tracks with respect to an electronic map, there are situations in which the resulting reconstructed route does not adequately resemble the initial track. There is thus scope for improvement in the polyline based techniques for reconstructing routes, in particular which may be applied to the reconstruction of a range of different types of track.

The Applicant has realised that there is a need for improved methods of reconstructing tracks of various forms in relation to an electronic map, which address some of the drawbacks identified with previously proposed polyline routing type approaches.

SUMMARY OF THE INVENTION

In accordance with a first aspect of the invention there is provided a method of generating a route reconstructing a track through a navigable network in an area covered by an electronic map, the electronic map comprising a plurality of segments representing navigable elements of the navigable network, the method comprising:

obtaining data indicative of a track through the navigable network to be reconstructed, wherein said data indicative of the track comprises an ordered series of point locations;

selecting one or more of the point locations, and defining a respective area associated with each of the one or more selected point locations;

using the ordered series of point locations and the defined areas associated with each of the selected one or more point locations to determine a plurality of polylines, each polyline being representative of a portion of the track to be reconstructed;

generating, for each of the polylines, a first route along segments of the electronic map using a first routing process based on the respective polyline, wherein the generated first route provides a reconstruction of the portion of the track represented by the polyline through the navigable network in relation to the electronic map; and generating, for the defined area associated with each of the selected one or more point locations, a second route along segments of the electronic map using a second routing process, wherein the second generated route provides a route through the defined area connecting the respective first generated routes, at least one of the segments of the second generated route being determined based in part on the relative distance between the segment and the point location to which the area is associated, wherein the route reconstructing the track comprises the generated first routes and the one or more generated second routes.

It has been found that by associating areas with selected point locations along the track, and requiring that the generated route providing the reconstructed track passes through the or each such defined area, in addition to following the polylines generated based upon the track, it is possible to obtain a reconstruction of the track that more closely corresponds to the original track than would be possible if using a polyline along to reconstruct the track. For example, reconstruction may be more reliable where the track incorporates certain features, e.g. loops or bends, point locations defining the track that are relatively sparse, and/or where map matching errors may be involved. As will be discussed in more detail below, the likelihood of the reconstructed route including certain artefacts around the origin and/or destination may also be reduced if the areas are associated with the origin or destination of the track. It has been found that the method also allows a wider range of potential input tracks to be reconstructed, provided that they are defined by a series of point locations. The defined area(s) associated with point locations act as waypoints, requiring that the generated route that reconstructs the track passes through the area(s). As each area defines a sub-region of the navigable network, rather than a specific point location, it provides what will be referred to as a "fuzzy" location or waypoint herein. The route is free to pass through any part of the area, rather than being constrained to incorporate any specific location, such as a point location, segment or point of interest (POI). As will be described below, these advantages may be achieved by appropriately selecting the point locations of the track that are to be associated with areas for use in route generation, to result in a suitable fuzzy location.

By providing data indicative of a plurality of polylines which represents the track to be reconstructed on the electronic map, together with one or more defined areas, each associated with a point location along the track, and then reconstructing the track by generating a route through the navigable network represented by the electronic map using both the polyline data and the area data, a route may be reconstructed in a more flexible manner, enabling other desired factors to be taken into account in the routing process. The route generation to provide the reconstructed track may be performed according to any usual desired route generation preferences, and preferably taking into account live conditions in the navigable network, but in a manner that additionally takes into account the polyline data and area data. For example, where a segment that might correspond to a portion of the polyline as represented in the electronic map, or a particular segment within a defined area as represented by the electronic map, is closed, or affected by a traffic jam, the routing process is free to route around this segment as during a normal route generation process which does not use polyline and area data. Thus, the polyline data and area data is used in addition to the other data that would normally be used during route generation, e.g. other cost data to provide the reconstructed route. The polyline data may be used to cause the generated route to generally follow the polyline, subject to any other constraints or preferences in the route generation process. However, the route generation process is not constrained to merely try to recreate the polyline as represented on the electronic map. Similarly, while the route is required to pass through the or each area, and preferably along a segment that is close to the centre of the area, the route is not constrained to pass through a particular point location within the area. The area therefore acts as a fuzzy location, being indicative of a general region through which the route must pass, i.e. a sub-region of the electronic map, rather than a specific point.

The steps of the method of the present invention in any of its aspects or embodiments may be carried out in part by a server and in part by a navigation device. The steps of the method may be performed exclusively on a server, or some on a server and the others on a navigation device in any combination, or exclusively on a navigation device. Thus, the system of the present invention in its further aspects discussed below may be provided in part by a navigation device or other mobile device, and in part by a server.

The method of reconstructing the track of the present invention is preferably implemented in the context of a navigation operation. Thus, the method is preferably carried out by a set of one or more processors of a device or system having navigation functionality. However, it will be appreciated that the methods may also be carried out by any suitable system having route generating capability, but not necessarily navigation functionality. For example, the methods may be implemented by a computer system, e.g. a desktop or laptop system, which does not have navigation functionality.

In preferred embodiments the steps of obtaining the polyline data, selecting the one or more point location along the track, defining an area associated with each point location, and using the data in generating a route to reconstruct the track, are carried out by a navigation device, and the present invention extends to a navigation device arranged to carry out such steps of the method of any of the aspects or embodiments of the invention. The device is preferably a mobile device. The navigation device may be a personal navigation device (PND) or an integrated, e.g. in-vehicle, device.

In accordance with any of the aspects or embodiments of the invention the navigation device may comprise a display for displaying the electronic map to a user, a set of one or more processors configured to access the electronic map data and cause the electronic map to be displayed to a user via the display, and a user interface operable by a user to enable the user to interact with the device. Thus, the system of the present invention may be a system, e.g. processing device of a navigation device.

The present invention extends to a system for carrying out a method in accordance with any of the aspects or embodiments of the invention herein described.

In accordance with a second aspect of the invention there is provided a system for generating a route reconstructing a track through a navigable network in an area covered by an electronic map, the electronic map comprising a plurality of segments representing navigable elements of the navigable network, the system comprising:

means for obtaining data indicative of a track through the navigable network to be reconstructed, wherein said data indicative of the track comprises an ordered series of point locations;

means for selecting one or more of the point locations, and defining a respective area associated with each of the one or more selected point locations;

means for using the ordered series of point locations and the defined areas associated with each of the selected one or more point locations to determine a plurality of polylines, each polyline being representative of a portion of the track to be reconstructed;

means for generating, for each of the polylines, a first route along segments of the electronic map using a first routing process based on the respective polyline, wherein the generated first route provides a reconstruction of the portion of the track represented by the polyline through the navigable network in relation to the electronic map; and means for generating, for the defined area associated with each of the selected one or more point locations, a second route along segments of the electronic map using a second routing process, wherein the second generated route provides a route through the defined area connecting the respective first generated routes, at least one of the segments of the second generated route being determined based in part on the relative distance between the segment and the point location to which the area is associated, wherein the route reconstructing the track comprises the generated first routes and the one or more generated second routes.

Preferably the system comprises, or is, a navigation device which provides the means for obtaining the data indicative of the polyline, the means for selecting the at least one point location along the track to be reconstructed, and means for defining an area associated with the or each point location, and means for using the obtained polyline data in generating a route. Nonetheless, other arrangements are possible. For example, it is envisaged that obtaining the data indicative of the polyline, and selecting the point location(s) and defining an area associated with each point location, may be carried out in one part of a system e.g. by a server or first navigation device, with the polyline data and area data then being provided to another part of the system e.g. a (second) navigation device for use in route reconstruction. In yet other arrangements, the polyline data and area data may be determined in separate parts of a system, and provided to a further part of the system for use in route reconstruction.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

Accordingly, the method of reconstructing a track of the present invention, or at least the steps of obtaining and using the polyline data and the area data in route generation, is preferably carried out by a navigation device, and the system for reconstructing the track of the invention is preferably provided, at least in part, by a navigation device. The navigation device is a device having access to the electronic map data. The navigation device then carries out, or comprises means for carrying out, the steps of obtaining the polyline data and the area data, and using the polyline data and area data in generating the route. The step of generating the route is preferably carried out by a routing engine of the navigation device. In any of the embodiments in which a navigation device is used, preferably the navigation device stores the electronic map, i.e. electronic map data. The navigation device may comprise means for storing the electronic map.

In accordance with the invention, polyline data is obtained representative of the track through the network that is to be reconstructed. The term "polyline" is used herein in its conventional sense. The polyline is defined by a series of points connected by line segments. The data indicative of the polyline may be indicative in any manner of the polyline, whether directly or indirectly. For example, the polyline data may comprise a list of the points (e.g. in the form of latitude and longitude coordinates) defining the polyline and/or data indicative of the line segments connecting the points.

The method of the present invention involves obtaining data indicative of the track through the navigable network to be reconstructed.

The data indicative of the track comprises data indicative of an ordered series of point locations. The data indicative of the series of point locations is indicative of a location of each point location, and an order of traversal of the point locations. The track to be constructed may be any path through the navigable network which may be defined by a series of point locations. The point locations may be in the form of coordinate pairs. The data indicative of the track to be reconstructed may be obtained from any suitable source or sources. While the track data may be data recorded by a device that performs track reconstruction during travel along the track, in other embodiments the track data is obtained from one or more external sources. For example, a navigation device which performs route reconstruction may receive the track data from another navigation device or from a server. In other arrangements, the track data may be input by a user, e.g. in the form of a planned route or itinerary.

The track may be a previously travelled track or a track for future travel. The track may, for example, be a path that has previously been travelled, e.g. a recorded track, an itinerary, or a pre-planned route. An itinerary may be an itinerary that has been previously travelled, or that is for future travel. A pre-planned route may be a previously travelled route, or a route for future travel. Such types of track may all be defined by a series of point locations, although the spacing of the point locations will typically vary depending upon the nature of the track and the manner in which they were generated. The data indicative of the track, whatever the nature of the track, is preferably map agnostic data. In other words, the data indicative of the track is not in relation to an electronic map.

Where the track is a previously travelled path, the data indicative of the track may comprise positional data (e.g. geographical coordinates, such as longitude and latitude), optionally with associated timing data, e.g. time-stamped positional data, which can be used to determine the order of the positional data. The positional data may be data obtained from a global navigation satellite system (GNSS) receiver, or any other suitable position determining means, such as by using a mobile telecommunication network (e.g. GSM). The data is historical positional data.

In preferred embodiments, the previously travelled route is a route travelled by a navigation device that uses the data to reconstruct the track. The data indicative of the track may then be data recorded during travel along the route by the same navigation device which performs the track reconstruction method. The data may be data stored by a track recording subsystem of the device. However, the route may be a route travelled by another device. The device may be any device capable of providing positional data, and optionally sufficient associated timing data, for the purposes of the present invention, and may or may not be a navigation device. The step of obtaining the route data may comprise receiving data relating to the movement of a or the device with respect to time through the network. In some embodiments the method may extend to the step of storing data indicative of the movement of a or the device with respect to time, e.g. time-stamped positional data, during travel of the device along a route to provide the data indicative of the previously travelled route. In preferred embodiments this step is carried out by the same navigation device that then carries out route reconstruction, and preferably using data relating to the previous movement of that same device. The present invention enables such data indicative of previously travelled routes to be used to reconstruct the routes in relation to the electronic map data of the particular device.

In embodiments in which the track is a pre-planned route, the point locations of the track data may correspond to the locations of waypoints, such as decision points of the navigable network encountered along the route. It will be appreciated that a pre-planned route through the navigable network may be defined in terms of a list of waypoints e.g. decision points, and their order. A decision point of the navigable network refers to a point at which there are two or more outgoing segments in the direction of travel. A waypoint in this instance refers to a specific location through which the route must pass. Data indicative of a track corresponding to a pre-planned route may be received e.g. from a server, or may be planned by the same device which is to perform track reconstruction. The track data may be received from a server as part of a hybrid routing system. Thus, in some embodiments data indicative of at track which provided a pre-planned route may be generated off-board i.e. is externally generated. As the present invention provides data indicative of the track to be reconstructed that is in the form of a polyline representation and additionally uses data indicative of waypoint area(s) associated with selected point location(s) to reconstruct the route in relation to the relevant electronic map, route reconstruction may be achieved based on initial route data in a wide variety of formats, providing greater flexibility than existing hybrid routing systems. There is no need for the initial route data to be of any specific form. Thus, the initial route may be a route generated using any route planning system. For example, a generic route planning website may be used, or a route planning website or similar that is provided by a particular vehicle manufacturer, etc. The method may extend to the step of generating the pre-planned route to be reconstructed. Thus, the pre-planned route may be any form of recommended route. A pre-planned route may be a route that is generated prior to commencing travel through the navigable network, or during travel through the navigable network, e.g. in relation to a remainder of a route being travelled. For example, the pre-planned route may be a route that is generated as an en-route alternative when a problem is encountered with a route that is currently being travelled. The pre-planned route may be a route that is generated in response to a detected deviation from a previously planned route, e.g. to return to the original route.

In embodiments in which the track is an itinerary, the point locations of the track data may correspond to locations visited or to be visited on the itinerary. For example, the point locations may correspond to points of interest (POI), important junctions (or decision points), destinations in a personal network of a user, such as home, gym, work, etc. The locations may be input by a user.

In general, the type of track of which the track data is indicative may vary widely, as may the source or sources of the data. The track may be any track, whether generated on-board or off-board. The steps of the invention may be applied to a number of different tracks, of the same or differing types.

It will be appreciated that the spacing of the point locations defining different types of track may vary widely. While the spacing of point locations corresponding to positional data indicative of a previously travelled track may be relatively close, so as to provide a high density of point locations along the track e.g. corresponding to the spacing of received items of GPS data, in other cases, such as where the track describes an itinerary, the spacing of the point locations may be considerably sparser. Other types of track may be associated with intermediate densities of point locations. The spacing of point locations along a track may vary along the length thereof, such that even if there is a higher density of point locations in some parts, in others the point locations may be sparse. The present invention provides the ability to reliably reconstruct tracks defined by point locations regardless of the density of the point locations describing the track, and therefore provides the ability to reconstruct tracks regardless of the type of input track data, and the nature of the track described by the data.

In embodiments of the invention, a first polyline representative of the track to be reconstructed is determined using the ordered series of point locations. The defined areas associated with each of the selected one or more points locations is then used to cut (or divide) the first polyline into a plurality of second polylines. Each of these second polylines is thus representative of a portion of the track to be reconstructed, and can be used, based on the first routing process, to determine a first route.

In accordance with the invention, whatever the nature of the track, one or more point locations are selected along the track, and a respective area is defined associated with the or each point location. One area is defined in respect of each point location.

In embodiments, the point locations for which an associated area is defined may be those that are spaced from a neighbouring point location by more than a predetermined distance. The distance may be the geodesic distance between the geographic positions identified by the two point locations, or it may simply be a straight line distance between the two point locations. The distance may be any value as desired, but can, for example, be around 1000 m.

Additionally, or alternatively, the point locations for which an associated area is defined may be those that represent the head of a loop or curve in the track. For example, though the ordered list of point locations can be analysed to determine if the track contains any portions having a curvature above a certain level. An area is then associated with a point location on this curved portion of the track. Any suitable technique can be used to determine these one or more curved portions of the track. For example, through the use of Delaunay triangulation, and the subsequent comparison of the lengths of the triangles determined, it is possible to identify point locations of the track that are on a curved portion of the track. In an embodiment, the determination of such point locations only occurs if the (geodesic) distance between the start and end locations of a track is less than the (geodesic) distance along the track as defined by the ordered series of point locations, e.g. by a predetermined amount or percentage. As will be appreciated, the closer these two distance values are for a track, then the straighter the track.

Additionally, or alternatively, the point locations for which an associated area is defined may be a point location at the origin, e.g. start location, and/or destination, e.g. end location, of the track. In such embodiments, a route is generated from a segment within the defined area to the respective first generated route, the segment being determined in part on the relative distance between the segment and the point location to which the area is associated. This may be useful in avoiding problems arising from map matching. When positional data is received from a device in a navigation system, the positional data may be matched to a position on a segment of the network of navigable segments represented by an electronic map. This process may be referred to as "map matching", and may involve the use of various algorithms as known in the art. Errors in map matching may arise for various reasons, such as, for example, general noise in the positional data signals, and/or mapping errors e.g. where a reference line of a navigable segment is not correctly geo-referenced in the map such that the position of the navigable segment represented by the electronic map does not precisely correspond to the actual position of the segment in reality. In some situations, as a result of a map matching error, where the data indicative of the point location representing the origin or destination of the track to be reconstructed is with respect to an electronic map, the point location may be on a different navigable segment of the electronic map to that corresponding to the segment of the navigable network along which the origin or destination lies in reality. The origin or destination location may be matched to another segment close to the correct one. For example, where the correct initial navigable segment is a unidirectional segment, the origin location may be erroneously matched to a unidirectional segment for travel in the opposite direction e.g. an opposite carriageway, or to a segment that passes over the correct segment in the vicinity of the origin location e.g. via a bridge crossing the segment. When attempting to reconstruct a track with respect to another electronic map based upon data having such an error in the map matching of the origin or destination, and using polyline based techniques, the resulting route may exhibit some artefacts around the origin or destination as the reconstructed track is compelled to try to follow the polyline. For example, the reconstructed may follow a path in the opposite direction to that followed by the track in reality, where the origin location matched to the opposite carriageway, before performing a U-turn at the next junction to be able to rejoin the carriageway in the correct direction, and hence revert to a route following the polyline. A similar problem may arise at the destination. By defining an area around the origin and/or destination, the route is required only to pass through the area, and is provided with greater latitude as to how it does so in comparison to pure polyline techniques, where the route is forced to try to follow the polyline. A more sensible route may then be generated to reconstruct the track, avoiding artefacts such as unnecessary U-turns or similar around the origin or destination.

It is considered that the use of areas associated with the start and/or end locations of a track when generating a route reconstructing the track is new and advantageous in its own right.

Thus, according to a further aspect of the invention there is provided a method of generating a route reconstructing a track through a navigable network in an area covered by an electronic map, the electronic map comprising a plurality of segments representing navigable elements of the navigable network, the method comprising:

obtaining data indicative of a track through the navigable network to be reconstructed, wherein said data indicative of the track comprises an ordered series of point locations from an origin location to a destination location;

selecting one or both of the origin and destination locations, and defining a respective area associated with each of the one or more selected point locations;

using the ordered series of point locations to determine one or more polylines, each of said one or more polylines being representative of at least a portion of the track to be reconstructed;

generating, for each of the one or more polylines, a first route along segments of the electronic map using a first routing process based on the respective polyline, wherein the generated first route provides a reconstruction of the at least a portion of the track represented by the polyline through the navigable network in relation to the electronic map; and generating, for the defined area associated with each of the selected one or more point locations, a second route along segments of the electronic map using a second routing process, wherein the second generated route provides a route from a segment within the defined area to the respective first generated route, the segment being determined based in part on the relative distance between the segment and the point location to which the area is associated, wherein the route reconstructing the track comprises the generated one or more first routes and the one or more generated second routes.

The present invention further extends to a system for carrying out a method in accordance with this further aspect of the invention, or embodiments thereof, herein described.

Thus, according to a further aspect of the invention there is provided a system for generating a route reconstructing a track through a navigable network in an area covered by an electronic map, the electronic map comprising a plurality of segments representing navigable elements of the navigable network, the system comprising:

means for obtaining data indicative of a track through the navigable network to be reconstructed, wherein said data indicative of the track comprises an ordered series of point locations from an origin location to a destination location;

means for selecting one or both of the origin and destination locations, and defining a respective area associated with each of the one or more selected point locations;

means for using the ordered series of point locations to determine one or more polylines, each of said one or more polylines being representative of at least a portion of the track to be reconstructed;

means for generating, for each of the one or more polylines, a first route along segments of the electronic map using a first routing process based on the respective polyline, wherein the generated first route provides a reconstruction of the at least a portion of the track represented by the polyline through the navigable network in relation to the electronic map; and means for generating, for the defined area associated with each of the selected one or more point locations, a second route along segments of the electronic map using a second routing process, wherein the second generated route provides a route from a segment within the defined area to the respective first generated route, the segment being determined based in part on the relative distance between the segment and the point location to which the area is associated, wherein the route reconstructing the track comprises the generated one or more first routes and the one or more generated second routes.

The present invention in accordance with these further aspects may include any or all of the features described in relation to the other aspects and embodiments of the invention, to the extent that it is not mutually inconsistent therewith.

The following apply to any one or ones, or each area, where multiple areas associated with selected point locations are defined for use in reconstruction of the track. The area defined for a given selected point location is a sub-region of the navigable network. The area includes the point location with which it is associated. The area defined associated with a point location is preferably an area centred on the point location. The area is automatically defined based on the point location. The area may be of any shape and size. In some embodiments the area is a circular area centred on the point location, and having a particular radius. The radius may be a predetermined radius, e.g. 1 km. The size of the area, e.g. the radius, may be determined based on the reason for selecting to associate an area with the point location. For example, a smaller area may be associated with the origin and/or destination than, for example, with a point location selected due to distance from a neighbouring location (sparsity) or curvature.

The step of defining the or an area may comprise defining an initial area including the selected point location in accordance with any of the above described methods, verifying whether the area covers an appropriate portion of the network of navigable segments, and, where the area is found not to cover an appropriate portion of the network, i.e. to be of insufficient size, increasing the area until the area is found to be to cover an appropriate portion of the network, i.e. to be of sufficient size. For example, the area may be increased by increasing the radius defining the area. The area may be increased continually, or incrementally. For example, the area may be increased in 1 km increments. This may be necessary where an initial area corresponds to an area of a park, which may have no segments therethrough. In some embodiments the area is increased incrementally, and checked after each increase to determine whether the increased area covers an appropriate portion of the network, i.e. is of sufficient size. Once an area of appropriate size is reached, whether or not increase of an initial area was required, the area is taken as the defined area for use in the remainder of the method.

In accordance with the invention in any of its aspects or embodiments, the method comprises using the data indicative of the one or more polylines ("the polyline data") and the data indicative of the or each defined area to generate a route through the navigable network as represented by the electronic map, which generated route provides a reconstruction of the track in relation to the electronic map. The generated route is arranged to reconstruct the path of the polylines with respect to the electronic map, while passing through the or each defined area associated with a selected point location represented by the map. More specifically, in the invention, a first route is generated, for each of the polylines, using a first routing process based on the respective polyline, wherein the generated first route provides a reconstruction of the portion of the track represented by the polyline through the navigable network in relation to the electronic map. A second route is further generated, for each of the defined areas, using a second, different routing process, wherein the second generated route provides a route through the defined area connecting the respective first generated routes. The route reconstructing the track comprises the generated first routes and the one or more generated second routes.

The first routing process preferably comprises favouring segments of the electronic map for inclusion in the generated route that are in greater proximity to the polyline as represented on the electronic map. In other words, the segments that are relatively closer to the polyline as represented on the electronic map are favoured in the route generation process over those segments which relatively further from the polyline as represented on the electronic map. In this way, those segments which are in greater proximity to the polyline, i.e. relatively closer to the polyline than other segments of the electronic map, are more likely to be included in the generated route. It will be appreciated that references herein to segments of the electronic map being closer to or further from the polyline refer to the segments being closer to or further from the polyline as represented on the electronic map if not explicitly stated.

By favouring those segments which are in proximity to the polyline, the resulting generated route will be attracted toward the polyline. However, the generated route is not forced to be identical to the polyline. Thus, the segments are caused to be treated more favourably by a routing engine than those which are in lesser proximity to the polyline. The segments may be favoured by applying a positive weighting factor to the segments and/or by penalising those segments that are in lesser proximity to the polyline as represented on the electronic map. This may be achieved by appropriate manipulation of the cost associated with the segments that is used in route generation, i.e. the cost of traversing a segment (after applying the cost function used by the routing engine) is modified, typically reduced, such that the segment is favoured more by the routing engine than would normally be the case.

It will be appreciated that the segments are favoured relative to other segments of the electronic map based upon their proximity to the polyline, and without taking into account any other preferences and/or constraints imposed on the routing process. In the route generation process, proximity to the polyline is only one of a number of factors that may be taken into account. For example, as is known in the art, factors such as length of segments, transit times for segments, congestion likelihood, etc may be taken into account. Thus it is not necessarily the case that a segment closer to the polyline will always be more likely to be included in the route than an alternative one further away when all relevant factors are accounted for. It is this that provides the invention with the flexibility to provide a reconstructed route that is generally attracted to the polyline, while having the ability to deviate therefrom if appropriate, e.g. if a segment along or close to the polyline is closed or affected by congestion. It will be appreciated that the segments that are favoured or, in some cases, penalised in accordance with the invention are those segments which are considered for the purposes of the route generation. The segments may be a subset of the segments of the electronic map. For example, the segments may be segments of a routing corridor.

The proximity of a segment to the polyline may be assessed in any suitable manner. In some embodiments the method may comprise defining an area based on the polyline as represented on the electronic map, and favouring those segments of the electronic map which are considered to be within the area. In some embodiments this is achieved in part or entirely by penalising those segments which are not considered to be within the area. The area may be an area that includes the polyline, e.g. that is centred thereon. A segment may be considered to be within the area when it is entirely within the area, or at least partially within the area, or where at least a given portion is within the area, etc as desired. The area may be of any shape. In preferred embodiments the area is in the form of a corridor extending along and comprising the polyline.

In some embodiments in which segments not considered to be within the area based on the polyline as represented on the electronic map are penalised for inclusion in the route, the method may comprise precluding those segments from being included in the route. In other embodiments, a penalty factor may be applied to the segments so as to make them less likely to be included in the route, without precluding them from inclusion. The penalty factor may be a variable penalty factor depending upon distance of a segment from the polyline as described below.

In accordance with embodiments of the invention, favouring or penalising a segment for inclusion in the generated route results in the segment being more or less likely respectively to be included in the generated route than other segments of the electronic map which are considered for the purposes of route generation. This is preferably done in a manner that does not result in the segment being required to form part of the route and/or being prevented from so doing. Favouring a segment results in the segment being more likely to be included in the route at least relative to other navigable segments of the electronic map that are considered in route generation, and which are in lesser proximity to the polyline. Favouring a segment may involve applying a positive weighting factor to the segment to increase its likelihood of being included in the generated route, i.e. in comparison to the situation where the positive weighting factor were not applied, and/or may be achieved indirectly by penalising other navigable segments, i.e. those in lesser proximity to the polyline. Penalising a segment may involve applying a penalty factor to the segment to decrease its likelihood of being included in the generated route, i.e. in comparison to the situation were the penalty factor not applied. In preferred embodiments favouring those segments in greater proximity to the polyline in accordance with the invention is implemented by penalising navigable segments based upon their proximity to the polyline as represented on the electronic map. Such embodiments may be readily implemented by applying a suitable penalty factor which may then be taken into account during route generation as part of a cost function in a similar manner to other costs associated with segments, enabling the proximity of segments to the polyline to be treated as another factor to be taken account of when determining a least cost path.

Some preferred embodiments of the invention will now be described by reference to the case in which segments are penalised to result in those segments in greater proximity to the polyline being favoured. Nonetheless, it is envisaged that segments could alternatively be favoured to an extent dependent upon their proximity to the polyline in a similar manner, instead by applying a positive weighting factor to those segments closer to the polyline rather than by applying a negative penalty factor to the segments further away. A positive weighting factor might be applied that is variable, decreasing with increasing distance from the polyline.

In some embodiments, as described above, the method may comprise favouring those navigable segments that are within a given area based upon the polyline by precluding segments outside that area from being included in the generated route. However, in preferred embodiments the method involves the penalising navigable segments to differing degrees in dependence upon their proximity to the polyline. This has the result that the polyline acts to "attract" the route, with the degree of attraction increasing as the polyline is approached.

Preferably the step of favouring segments of the electronic map that are in greater proximity to the polyline as represented on the electronic map involves penalising segments of the electronic map to a degree which depends upon the proximity of the respective segments to the polyline as represented on the electronic map, wherein those segments that are further from the polyline are penalised to a greater degree than those that are closer to the polyline. In other embodiments a variable penalty factor depending upon distance from the polyline may be applied. Penalty factors might be applied to all segments, including those relatively close to the polyline, or only to segments that are outside an area based on the polyline, e.g. a corridor extending along the polyline. Thus a variable penalty factor may be applied in combination with the above described embodiments in which segments within an area based on the polyline are favoured. In these embodiments segments within the area may be favoured by not having a penalty factor applied thereto, with segments outside the area being penalised to a variable degree with distance from the polyline.

Preferably a navigable segment is penalised to an extent that is based on a distance between the navigable segment and the polyline as represented on the electronic map. Thus, a penalty factor applied to the segment may be determined based on the distance between the navigable segment and the represented being polyline. The degree to which a navigable segment is penalised is greater, the greater the distance between the navigable segment and the polyline as represented on the electronic map. Thus the penalty factor will be greater, the greater the distance between the navigable segment and the polyline. The degree to which a navigable segment is penalised may be proportional to a distance between the navigable segment and the polyline as represented on the electronic map, and most preferably to a square or higher order power of the distance. The penalty factor applied to a segment, or the degree to which the segment is penalised, may take into account variation in the distance between the segment and the representation of the polyline along its length. For example, the penalty may be based upon an average distance between the segment and the polyline. This may be achieved in any suitable manner. In some preferred embodiments a segment is penalised to a degree that takes into account the distances between each of a plurality of different positions along the segment, and the representation of the polyline. In some preferred embodiments penalty factors are determined for each of a plurality of different positions along the segment, each being based upon the distance between the segment at the respective position and the representation of the polyline. The method may comprise determining a penalty factor for each of a plurality of positions along the segment, the penalty factor for each position being based upon a distance between the respective position and the polyline as represented on the electronic map, and using each penalty factor to derive an overall penalty factor to be applied to the navigable segment. The penalty factor for the segment may be obtained by combining penalty factors determined for each of the plurality of positions along the segment. For example, the penalty factors for each of the positions may be summed. Any reference to a position along the navigable segment may be in relation to the position along the actual navigable segment represented by the electronic map, or an approximation thereof. Where multiple positions along a navigable segment are taken into account, the spacing of the positions may be chosen as desired to provide a balance between accuracy in results and processing time and power required. For example, a closer spacing may be required where the segment has a more complex shape, e.g. as described using one or more shape points.

It will be appreciated that for processing efficiency, an approximation of the segment may be used to indicate the general position of the segment, e.g. ignoring detailed shape points along the length of the segment. Thus the distance between a navigable segment and the representation of the polyline may be based upon a distance between an approximation of the navigable segment and the representation of the polyline. For example, a navigable segment may be approximated by a straight line connecting the end nodes of the segment. In some embodiments a decision as to whether to use an approximation of the navigable segment or the actual course of the navigable segment when determining the distance may depend upon a complexity of a shape of the navigable segment and/or its relationship to the polyline. In these circumstances use of an approximation of the course of the navigable segment may be more likely to result in inaccurate determinations for the distance between the segment and the polyline. For example, where the projection of positions along a navigable segment on to the polyline extend over more than one segment of the polyline, intermediate shape points of the navigable segment may be taken into account.

While in preferred embodiments the respective distances between multiple positions along a segment and the representation of the polyline are considered in penalising the segment, e.g. determining a penalty factor, other arrangements are possible. For example, a segment may be penalised to an extent based upon a distance between a reference position along the navigable segment and the representation of the polyline, or a representative position indicative of the average position of the segment and the representation of the polyline, or similar. The distance between a navigable segment, or a position thereon, and the polyline as represented on the electronic map may be measured in any suitable manner. The distance may be measured between the navigable segment, or position thereon, and a closest portion of the polyline. Preferably the distance is a projection of the segment or an approximation thereof, or a position on the segment or an approximation thereof, on the representation of the polyline.

The determination of a penalty factor for a segment, or where applicable for a position along the segment, may be dependent only upon the distance between the segment or position thereon and the polyline, or may take into account additional factors. The penalty factor for a navigable segment may be influenced by a level of resolution of the polyline or at least a part thereof. Preferably the penalty factor is greater, the greater the level of resolution of the polyline. One factor indicative of the level of resolution of the polyline is the length of the individual segments of the polyline relative to the overall length of the polyline. In some embodiments the penalty factor for a segment is influenced by the length of a segment of the polyline in proximity to the navigable segment. The segment of the polyline in proximity to the navigable segment is preferably the segment in relation to which the distance between the navigable segment, or position thereon, and the polyline is determined. For example, in some embodiments in which the distance between a segment, or position thereon, and the representation of the polyline is based upon a projection of the segment, or position thereon, and the polyline, the penalty factor for the segment or position thereon may additionally take into account a length of a segment of the polyline on to which the segment or position is projected. In some embodiments the penalty factor for a navigable segment or position thereon is inversely related to the length of a segment of the polyline e.g. the segment in proximity thereto. Thus, where the segment is relatively long, indicative of a coarse resolution of the polyline at least in that portion, the penalty factor would be smaller than in the case of a relatively short polyline segment. In this way, less weight is given to these portions of the polyline, such that the generated route is not attracted to a more coarsely resolved polyline or portion thereof to the same degree as to a more finely resolved polyline or portion thereof.

In some embodiments, the penalty factor for a navigation segment may be influenced by the proximity of the segment to an end of the polyline. In some embodiments the penalty factors applied to navigable segments closer to the ends of the polyline are relatively smaller than those applied to navigable segments closer to the middle of the polyline. Thus, for the same distance from the polyline, a navigable segment closer to the end of a polyline, e.g. that has a projection on to a segment of the polyline that is an end segment or within a given number of segments from the end segment of the polyline, or is within a given distance of the end of the polyline, will receive a penalty factor that is less than one that is toward the middle of the polyline e.g. that is not considered to be toward an end. This may result in a weaker attraction force to the polyline toward its ends, e.g. allowing a generated route to return to a specified first and second location for the route to be reconstructed where the polyline does not precisely extend between these points.

In the preferred embodiments in which a segment is penalised to an extent that is based upon the distance between the segment and the polyline, the polyline may act as a magnet, drawing the generated route back toward the representation of the polyline, but with a degree of attraction that increases with distance from the polyline. Thus, segments at a greater distance from the polyline will be penalised to a greater extent from those that are closer.

The second routing process preferably comprises exploring routes within the area to generate a route that passes through the area and connects to the first generated routes neighbouring the area (in the case of point locations selected due to sparsity or curvature), or to generate a route from a segment within the defined area to the respective, i.e. neighbouring, first generated route (in the case of the selected point locations being the start and/or end locations). In the former case, the generated route comprises one or more segments of the electronic map, wherein at least one of the segments is determined based in part on the relative distance between the segment and the point location to which the area is associated. In the latter case, the segment from which the generated route extends is again determined based in part on the relative distance between the segment and the point location to which the area is associated. In other words, the routing process comprises selecting a route from a plurality of possible routes containing a segment that is relatively closer to the centre of the area than a segment in one of the other possible routes. Any suitable routing (or pathfinding) algorithm can be used for the second routing process. For example, the second routing process may be based on a breadth-first search or a depth-first search.

The route generated through the navigable network may be generated in a standard manner, e.g. using a conventional routing engine, but additionally taking into account the polyline and area data. Thus, usual route planning preferences or settings may be retained, with the polyline data and area data providing an additional input that is used, for example, to result in segments closer to the polyline being favoured over those further away, and to ensure that the generated route passes through each area.

In some preferred embodiments the step of generating the route through the navigable network is carried out using "live" data. Live data as used herein in accordance with any of the aspects or embodiments of the invention refers to data which is relatively current and provides an indication of the relatively conditions in the network. The live data may typically relate to the conditions within the last 30 minutes, 15 minutes, 10 minutes or 5 minutes. "Historical" data, in contrast, refers to data that is not live, that is data that is not directly reflective of conditions in the network at the present time or in the recent past (perhaps within roughly the last five, ten, fifteen or thirty minutes).

The live data that may be used in accordance with the invention may be live data indicative of any factor or factors that may influence route selection in the navigable network under current conditions. The factor or factors may be any factors that will affect the flow of traffic along segments of the navigable network. The live data may comprise one or more of live traffic data, data indicative of road closures or data indicative of road works. In preferred embodiments the live data is data that has been received by a navigation device that carries out route construction from an external source, such as one or more servers. The use of live data is particularly useful in the context of reconstructing a pre-planned route. This enables a route to be pre-planned, e.g. by an external route planning system, and not necessarily immediately prior to departure, with the reconstruction by the navigation device being carried out at or around the intended time of departure in a manner that takes into account live conditions on the network. For example, there may be congestion or road closures that affect segments close to the polyline. The routing engine may then route around such segments as in a conventional route planning operation.

The method may comprise obtaining and storing data indicative of the reconstructed route by reference to the electronic map. The data may be in the form of a list of segment identifiers or similar.

The methods of the present invention in any of its aspects or embodiments may be carried out in relation to one or more tracks to be reconstructed. In some embodiments the methods are carried out in relation to a plurality of such tracks.

The generated route that provides a reconstruction of the track may be used in any desired manner. The method may comprise the step of storing data indicative of the generated route and/or outputting the route to a user. The method may extend to the step of carrying out one or more of: storing data indicative of the generated route; displaying the generated route; and generating and/or outputting a set of navigation instructions for guiding a user along the generated route. In embodiments in which data indicative of the generated route is stored, the data is preferably stored in association with the electronic map data. Likewise, displaying the generated route preferably comprises displaying the route on the electronic map.

In embodiments, a user may select a track, e.g. from a plurality of possible tracks on a device, such as a portable navigation device. A route representative of the track, i.e. a reconstruction thereof, is then generated as discussed above, e.g. using a routing engine of the device. This route is referred to herein as a track route. The user may, however, not be at the start of the track route, or indeed may be at a location somewhere along the track route. In other words, the current location of the user, e.g. device, is a location not on the track route. A further route is then generated using the electronic map from the current location of the user, e.g. device, either to a position on the track route. For example, the position on the track route can be one of: the start of the track route; the nearest positon on the track route from the current position of the user; or a selected position on the track route chosen by the user. A route generated for provision to the user may thus include a route through the navigable network from the current position of the user to track route and at least a portion of the track route. In embodiments, navigation instruction for guiding the user along this latter generated route are provided and/or the latter generated route is displayed to the user.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

The term "segment" as used herein takes its usual meaning in the art. A segment may be a navigable link that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GNSS (Global Navigation Satellite System), such as GPS (Global Positioning System), signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying Figures, in which:

FIG. 11 illustrates a track routing module of a navigation device which may be used in accordance with one embodiment of the invention; and FIGS. 12A-C illustrate various forms of track data which may be used in reconstructing a route in accordance with embodiments of the invention.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
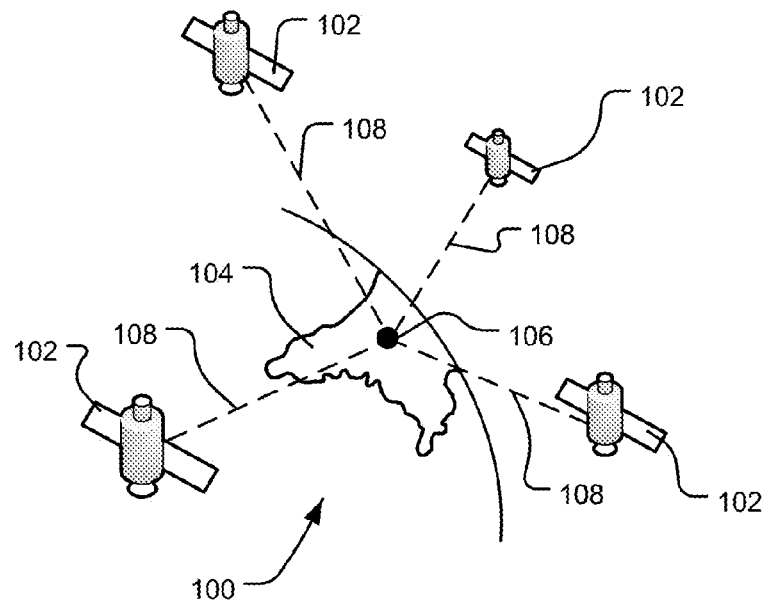
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
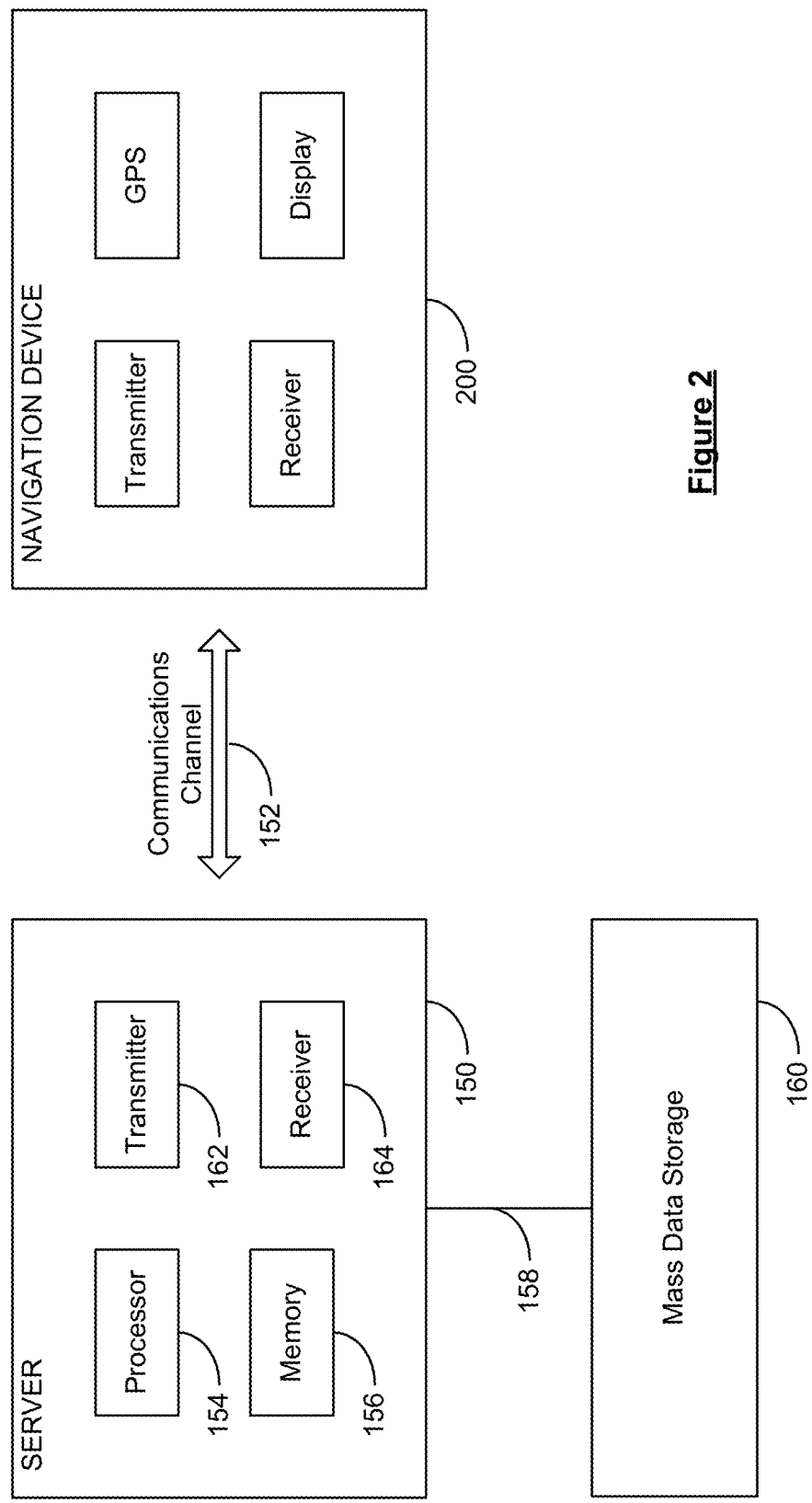
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc.

Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass data storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
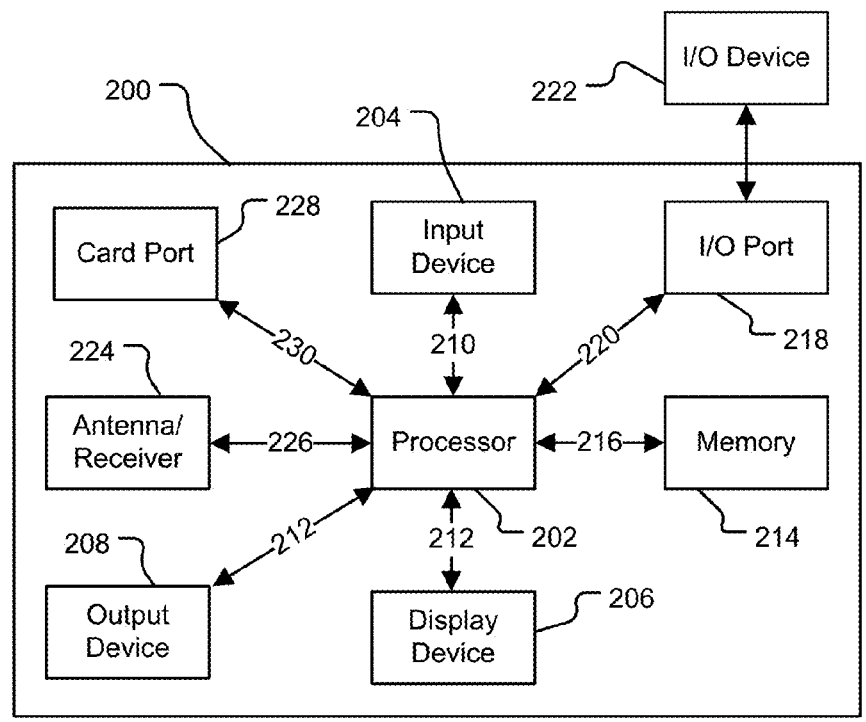
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like). FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
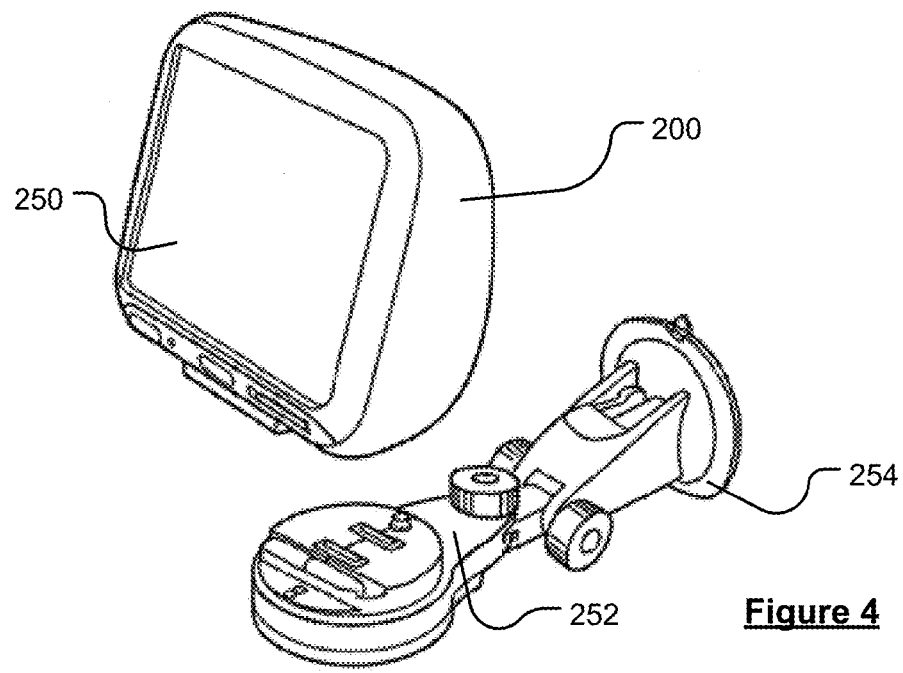
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time.

In some embodiments, it may be found that the quality of the captured data reduces as the period increases and whilst the degree of degradation will at least in part be dependent upon the speed at which the navigation device 200 was moving a period of roughly 15 seconds may provide a suitable upper limit. Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case. Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts. The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data. As discussed above, the mass data storage 160 also contains map data. Such map data provides information about the location of road segments, points of interest and other such information that is generally found on map.

By way of background, an embodiment of a prior art method for reconstructing a route using a polyline will now be described by reference to FIGS. 5 and 6; the method is published in WO 2015/132407 A2.

Figure 5:
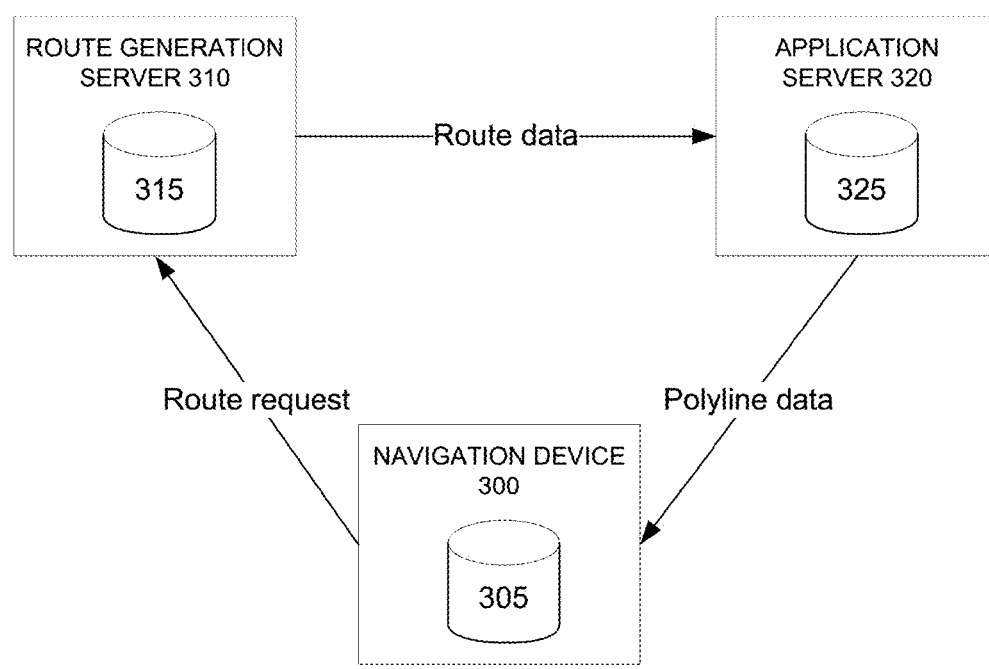
FIG. 5 illustrates a system which may be used to implement the methods of reconstructing a route using a polyline.
Figure 6:
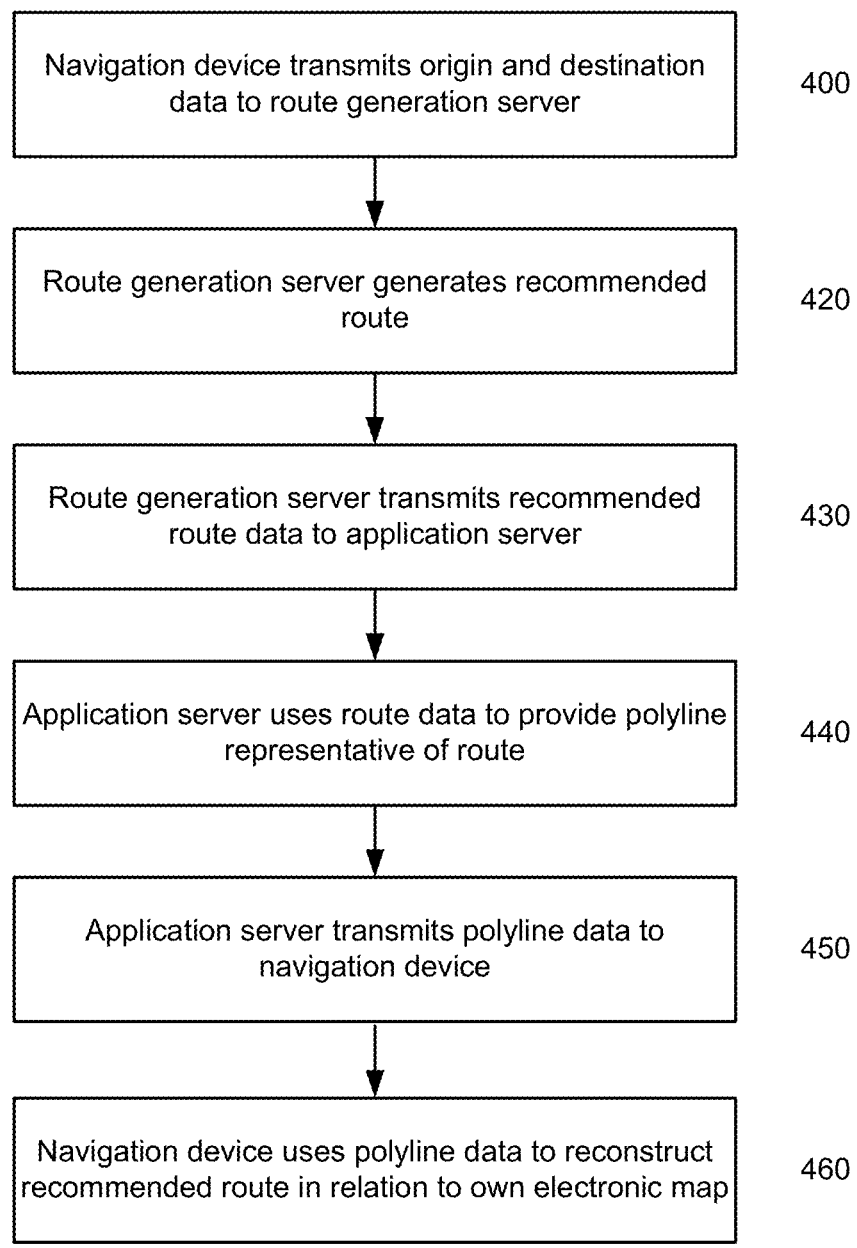
FIG. 6 is a flow chart outlining the steps of a method for reconstructing a route using a polyline.

FIG. 5 illustrates an exemplary system that may be used to implement the method. The system includes a navigation device 300, which can be in the form of a PND or an integrated in-vehicle device. The navigation device stores electronic map data having a plurality of segments representing navigable segments of a navigable network in a given area (map database 305). The navigation device is in communication with a third party server that provides route planning functionality, route generation sever 310. The navigation device 300 may transmit details of a first and second location, and optionally other relevant information, to the route generation server 310, which may then generate a route between the locations on behalf of the device using map database 315. The route generation server 310 is in communication with an application server 320 which is used to implement the methods of the present invention. The application server 320 is able to take data indicative of the route generated by the route generation server 310, and generate data indicative of a polyline representative of the route using amp database 325, which is preferably then transmitted to the navigation device 300. Some or all of the digital map databases 305, 315 and 325 may be the same, i.e. comprise the same map data stored in the same map format, although in general the methods of the present invention, as discussed in more detail below, are applicable to embodiments in which the map databases 305, 315 and 325 are different, either in terms of the quality and/or quantity of the map data contained therein, and/or in terms of the format in which the map data is stored.

The steps of the prior art method will now be described by reference to FIG. 6. At some point, the navigation device 300 needs to generate a route through the navigable network represented by the electronic map data 305, which can be used by the device, e.g. to be displayed to a user, and to provide a set of navigation instructions for guiding the user along the route. The invention will be described by reference to the situation in which the navigation device needs to generate a route through the navigable network between an origin and a destination that are specified by a user. However, the invention is applicable to the generation of a route between any first and second locations which may be required by the navigation device for any reason, where one or both of the first and second locations may be determined by the navigation device or a user. For example, the first location may be a current location of the device.

The navigation device 300 transmits data indicative of the origin and destination of the required route to the route generation server 310—step 400. Additional information may be transmitted if desired to be used in route planning. The route generation server 310 then generates a recommended route between the specified origin and destination—step 420. This recommended route will be in relation to electronic map data 315 of the server. This map data may not be the same as the electronic map data of the navigation device. The route generation server 310 then transmits data indicative of the recommended route ("route data") to the application server 320—step 430. It will be appreciated that instead, the functions of the route generation server 310 and the application server 320 might be combined, so as to be provided by a single server. However, by separating these functions, a third party route generation server may be used. The route data can be transmitted from the route generation server 310 to the application server 320 in any suitable form, although typically, as the map databases 315 and 325 will be different, the route data is transmitted in a map agnostic format, e.g. as a location reference encoded using a system such as OpenLR™, AGORA-C and TPEG-ULR. Typically, these dynamic location referencing techniques with encode the recommended route by referencing nodes within a first digital map (e.g. map database 315) by their geographic coordinates, together with certain attributes of segments therebetween. This information can then be decoded or resolved on a second, different digital map (e.g. map database 325) to determine the equivalent location within the second digital map. Of course, the route data can be transmitted in other forms such as in the form of an ordered list of segment or node identifiers, e.g. in circumstances when the map databases 315 and 325 are the same.

The application server 320 receives the route data that is indicative of the recommended route, and converts the route data into a polyline representative of the route—step 440. The polyline data that is generated is indicative of a polyline in the form of a plurality of points connected by lines. For example, the data may be in the form of an ordered list identifying the points which are connected by the line segments in the polyline. The points may be defined in terms of latitude and longitudinal coordinates. The points may be spaced between 20 and 100 meters apart; so as to optimum processing efficiency. The polyline may take over forms, such a series of connected line segments, or as an ordered list of distances and bearings from a starting location (with each distance and bearing indicating the next line segment of the polyline).

The polyline need not exactly replicate the route. The polyline may be a generalisation of the route. For example, the number of points in the polyline may be reduced compared to a number of points between segments of the route that it represents, and/or initial polyline data may be subjected to a generalisation process to reduce the number of points, e.g. coordinates it includes. Thus the polyline is representative of the route in that it is at least similar thereto, and may be an approximation of the route.

Once the polyline has been generated, the application server 320 transmits the polyline data to the navigation device—step 450. The polyline data may be transmitted as an XML file.

The navigation device 300 receives the polyline data, and uses the data to reconstruct the route represented by the data in relation to its own electronic map data 305—step 460. The navigation device does this by carrying out a normal route generation process between the origin and destination, but taking into account the polyline data. This is done in a manner such that those segments in closer proximity to the polyline as represented by the electronic map data of the device are favoured for the purposes of route generation over those at a greater distance from the polyline. This may be achieved by applying a penalty factor to navigable segments of the electronic map for the purposes of the route generation based upon their distance from the polyline. Those segments which are further from the polyline are ascribed a higher penalty than those closer to the polyline. Penalty factors may be applied to all segments based upon their proximity to the polyline, or starting only from segments at a given distance from the polyline, e.g. which lie outside an area based on the polyline. The penalty factors applied to segments preferably increase in a continual manner with increasing distance from the polyline. However, it is envisaged that other arrangements may be used, e.g. a stepped increase, or single penalty level for segments outside an area close to the polyline.

A least cost route is then generated through the network represented by the electronic map, e.g. using conventional graph search techniques, such as the well-known Dijkstra's algorithm, but wherein the cost values associated with traversing segments are adjusted or determined depending upon the proximity of the segments to the polyline. However, the cost for traversing a segment will also include contributions based on other factors that are to be considered in route generation e.g. traversal time for the segment, length of segment, curvature, etc.

It will be appreciated that the navigation device 300 will carry out a step of representing the polyline on its electronic map. This may be achieved by matching the coordinates defining the polyline to locations representing the coordinates according to the electronic map data. The segments of the polyline may not correlate to segments of the electronic map. However, this does not prevent the polyline being used to carry out route generation in a manner which favours those segments of the electronic map closer to the polyline.

In this way, the resulting generated route will tend to be attracted to the polyline. However, it is not compelled to try to replicate the polyline. This means that there is freedom to take into account other route planning preferences, or "live" data, which might result in segments being more appropriate for inclusion in the route than those closest to the polyline. The route generation advantageously takes into account live data, e.g. relating to traffic along segments, closures affecting segments, diversions, roadworks, etc. This may be obtained by the navigation device 300 from any suitable source, e.g. a traffic server. In this way, the resulting route that is generated is based upon the recommended route generated by the route generation server 310, but taking into account current conditions in the road network. The route is not compelled to include segments that are close to, or on the polyline, if those segments are closed, or subject to heavy traffic, etc.

Of course, the polyline data may be used in other manners such that segments closer to the polyline will be favoured in route generation. For example, an area may be defined around the polyline as represented by the electronic map data, with the route generation process considering only navigable segments within that area. A fixed penalty factor may be applied to segments outside the area, or one that varies so that segments are assigned a higher penalty the further they are from the polyline.

Once the navigation device has reconstructed the route in relation to its own electronic map data, it may use the route in any suitable manner, and may display the route and/or generate a set of navigation instructions to guide a user along the route.

The Applicant has realised that such methods of reconstructing a route using polyline data have some limitations. Some examples of situations that methods in accordance with the present invention are beneficial in solving will be illustrated by reference to FIGS. 7A, 7B, 7C, 8A, 8B and 9.

Figure 7A:
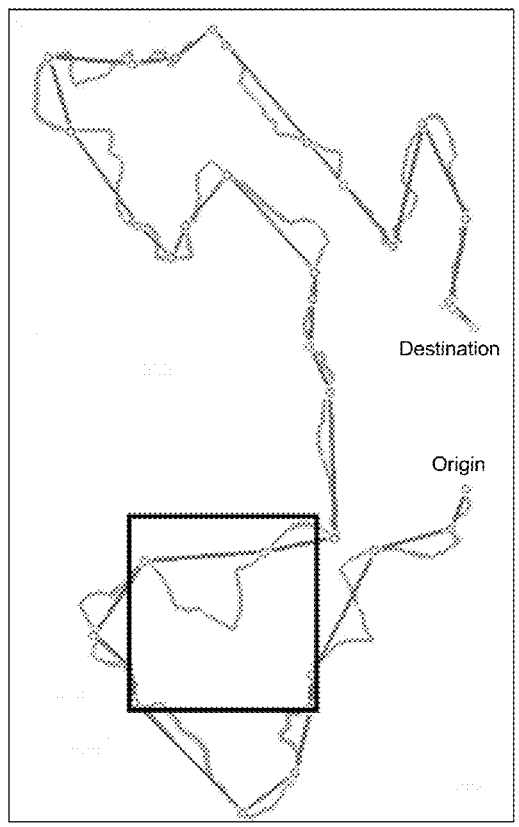
FIGS. 7A-C illustrate a first example of a situation involving the reconstruction of a route that is improved by methods of the present invention.
Figure 7B:
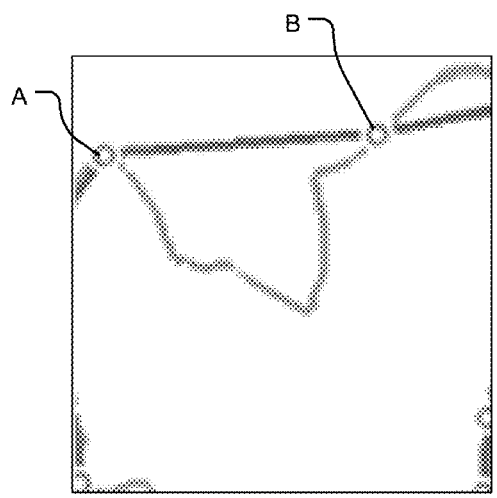
Figure 7C:
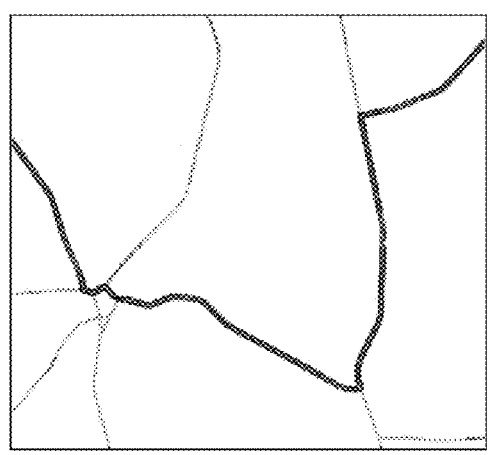

FIG. 7A shows a polyline representation of a track; the polyline being formed by the straight line segments between the series of point locations. Also shown is the route determined as a reconstruction of the track. FIG. 7B shows an enlarged version of the bounded region of FIG. 7A; also illustrating the polyline and the generated route. FIG. 7C shows the generated route of FIG. 7B. These figures depict a situation where the point locations A and B are separated by a distance greater than a predetermined value, e.g. 1 km, and wherein the use of fuzzy locations at points A and B allows a sensible route to be generated by removing the strict adherence to the path followed by the polyline.

Figure 8A:
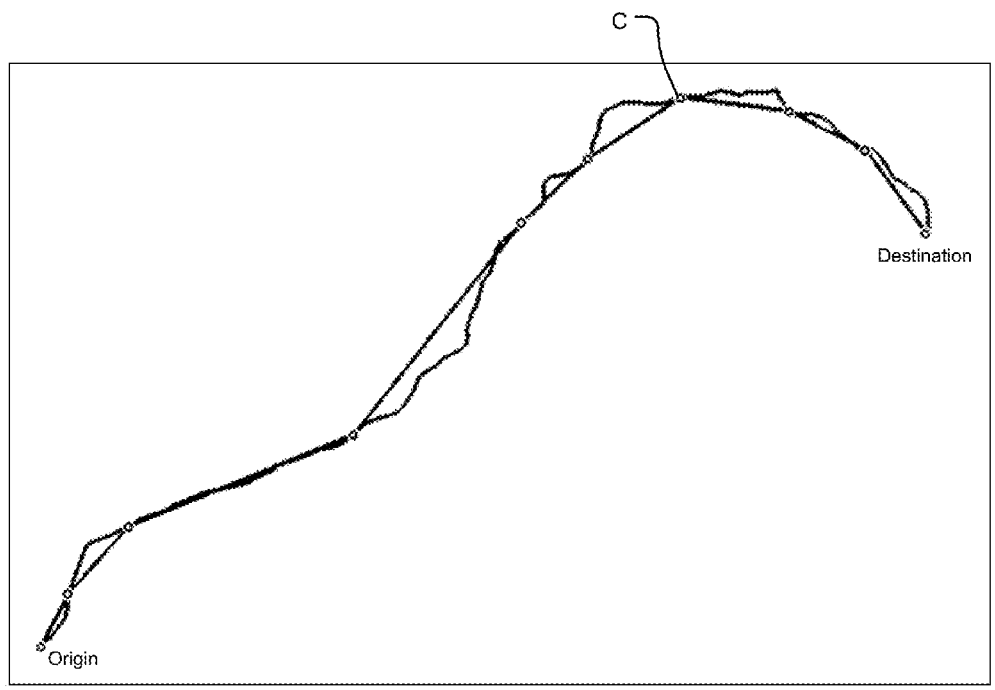
FIG. 8A illustrates a second example of a situation involving the reconstruction of a route that is improved by methods of the present invention, while FIG. 8B illustrated a method of identifying curves in the polyline.
Figure 8B:
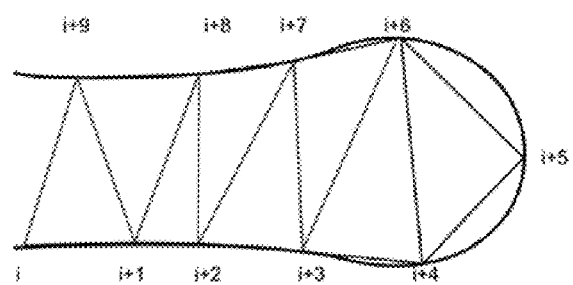

FIG. 8A shows another polyline representation of a track; the polyline being formed by the straight line segments between the series of point locations. Also shown is the route determined as a reconstruction of the track. FIG. 8A depicts a polyline that includes a curve, and wherein point C is indented as the head of the curve; a fuzzy location is therefore used at point C to generate a sensible route. FIG. 8B shows an exemplary method for identifying curves in the polyline representation of the track. The polyline is made from points i to i+9. The polyline is subjected to a Delaunay triangulation method The next step, for example, is to find all sides E connecting Vi and Vj points of the polyline which satisfy next condition: length(E)<epsilon, j=i+/−2, where epsilon is some predefined value. In the example of FIG. 8B, point i+5 would be a fuzzy location, i.e. have an area associated therewith.

Figure 9:
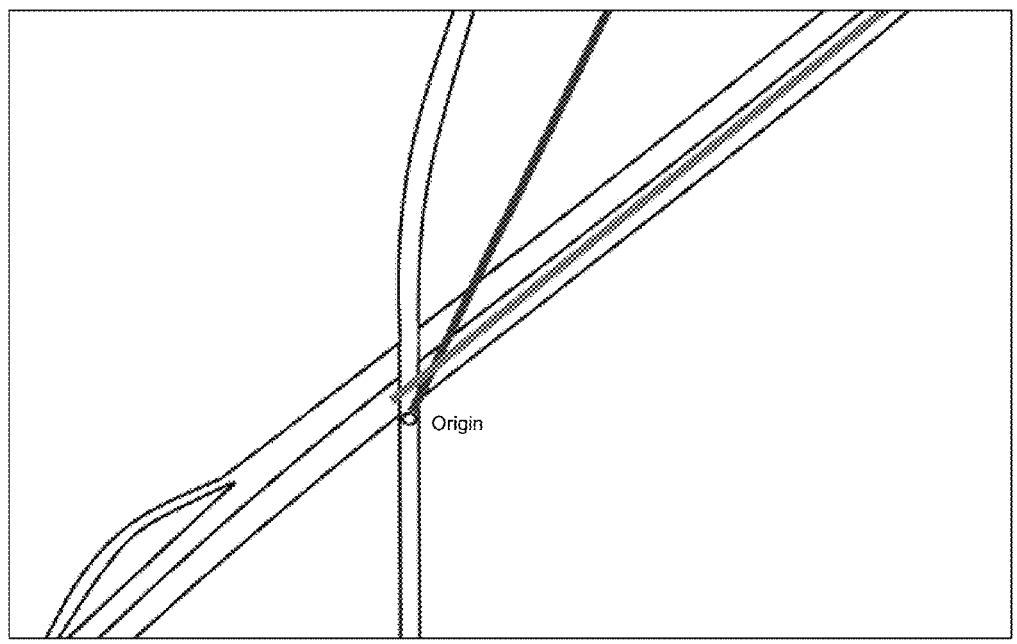
FIG. 9 illustrates a third example of a situation involving the reconstruction of a route that is improved by methods of the present invention

FIG. 9 shows an origin location of a track that due to map matching error is located on the overpass of the road network. By associating an area with the origin, i.e. such that it is a fuzzy location, then the generated route that represents a reconstruction of the track can correctly start from a position on the motorway extending under the overpass.

The Applicant has developed techniques that may be used in conjunction with polyline techniques of the type described by reference to FIGS. 5 and 6 above to help to overcome such problems. These techniques also provide the ability to reconstruct a wide range of types of track, without requiring the track data to be of a particular form.

Some preferred embodiments of the method of the present invention will be described by reference to FIGS. 10, 11, 12A, 12B and 12C. In these embodiments, the methods are described as being implemented by a navigation device. However, it will be appreciated that such arrangements are merely exemplary, and at least some of the steps of the method may be carried out by a server or another navigation device.

Figure 10:
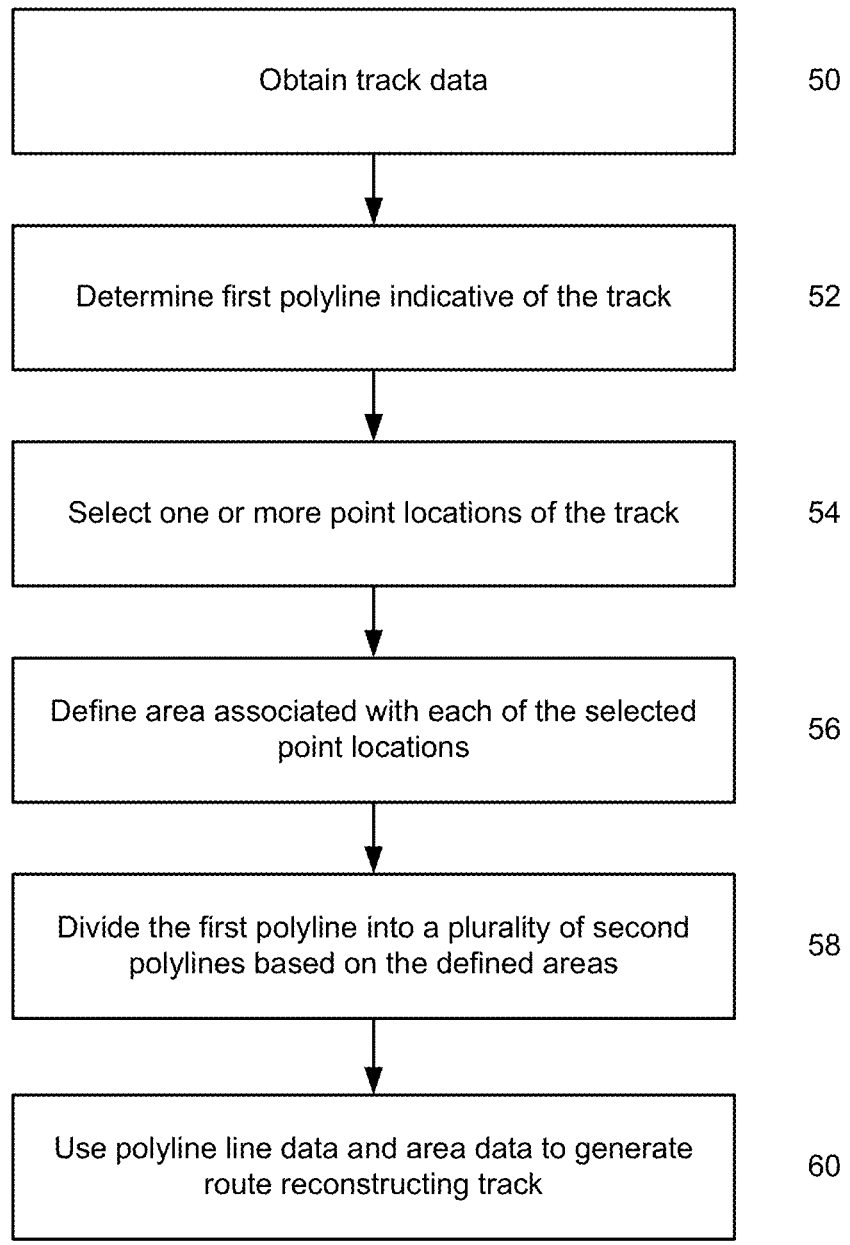
FIG. 10 is a flow chart illustrating the steps of a method for reconstructing a route in accordance with one embodiment of the invention.

Referring to FIG. 10, which illustrates the steps of an exemplary method of the invention, data indicative of a track to be reconstructed is obtained by a navigation device—step 50. The track may be of any suitable form. By way of illustration, the invention will be described by reference to three different types of track that may be reconstructed; an itinerary, a pre-planned route, and a recorded track.

It is envisaged that the navigation device may receive track data from a number of different sources. One example of how this may be achieved is shown in FIG. 11. FIG. 11 illustrates a track management module 20 of a navigation device. The module includes stored itineraries 22 and stored tracks 24. The stored tracks include pre-planned routes and recorded previously travelled routes, i.e. recorded tracks. The navigation device includes a track recording module 26 which may provide data for storage in the route store 24. The track recording module 26 stores positional data, and optionally associated timing data, obtained during travel of the navigation device along a route, e.g. time stamped GPS data. It will be appreciated that the recorded track may correspond to travel along a pre-planned route, but this need not be the case. Each recorded route may be added to the track store 24. Tracks may also be obtained for inclusion in the track store 24 from external source(s). For example tracks may be imported from various sources e.g. as XML, such as GPX files. Such files may be indicative of third party generated routes, manually created routes, or routes created in any manner. Track data may be obtained via any suitable communications link whether wired or wireless. Itineraries may be added to the itinerary store 22 by importing ITN files from various sources, or may be input by a user via a user interface 28 of the navigation device. In this way, it will be seen that routes and itineraries, or more generally "tracks", may be obtained from various sources, whether external or internal to the navigation device, for inclusion in the track management module 20. It will be appreciated that the navigation device need not include a track management module of the type shown in FIG. 11, and may reconstruct tracks on a track by track basis when received from an external source, or recorded by the device, etc.

Whatever its form, the data indicative of a track is in the form of a series of point locations. The point locations are defined in a map agnostic manner, e.g. as coordinates, or using some other map agnostic format (although embodiments are also envisaged in which the track data is by reference to an electronic map). Any suitable map agnostic format may be used. For example, the track data may be location reference encoded using a system such as OpenLR™, AGORA-C and TPEG-ULR. A map agnostic format may reference a location in relation to coordinates, or by reference to certain defined points of the navigable network which may act as location references, e.g. as an offset from the position of a node, etc. The corresponding location as represented by an electronic map may then be determined.

The track data includes data indicative of an order of the point locations, whether implicit or explicit. For example, specific points may be numbered, or may be associated with timestamp information in the case of a recorded track, enabling the sequence of the point locations to be determined. Three examples of tracks, and the type of track data that may be used, will now be described. While the track is defined by the point locations, the point locations may be connected in order using straight lines to provide a notional path of the track between the points. The point locations defining each type of track shown in FIGS. 12A, 12B and 12C respectively is shown superposed on segments of the navigable network to which they relate. However, the track data that is available to the navigation device will consist of series of point locations defining the route e.g. an ordered list of point locations.

As shown in FIG. 12A, in a first exemplary arrangement, the track is in the form of an itinerary. This includes three locations in the navigable network, labelled 1, 2 and 3, which are to be, or have been visited. Such an itinerary may be input by a user, or may be imported. It will be appreciated that the route may not have been generated for use as an itinerary. In some situations, the itinerary data may be indicative of a pre-planned or previously travelled route obtained from a third party source. Importing such routes as itineraries may be the only way to introduce them to the track management module. The itinerary data therefore includes only a limited number of point locations.

FIG. 12B shows a pre-planned route including 6 point locations indicative of waypoints for the route. These are relatively more closely spaced than the points of the itinerary shown in FIG. 12B. However, they are still relatively sparse, and the spacing of the points will vary along the route. Finally, FIG. 12C illustrates data indicative of a recorded track. Here the point locations, e.g. 31, 32, 33, are closely spaced, corresponding to the position of the device at regular time intervals. Such point locations may be as close as a few meters apart.

It will be seen that the nature of the track data, in particular the spacing of point locations defining tracks, is variable, depending upon the type of track described, and for any particular track, the spacing of the point locations may vary along the length of the track. The present invention provides methods for reconstructing tracks which may be applied to a diverse range of tracks, including those exemplified in FIGS. 12A-C. The tracks may include tracks that are round trips, with the origin and destination being the same.

When it is desired to reconstruct a given track with respect to an electronic map of the navigation device, certain pre-processing of the track data is carried out. It is envisaged that these steps could alternatively be carried out upon receipt of a new track for storage in the track module 20, with data indicative of the pre-processed track being stored until required.

Returning to FIG. 10, once data indicative of a track to be reconstructed has been obtained, e.g. from the track module, a first polyline is determined from the point locations—step 52. The polyline may be determined in accordance with the previously described prior art methods, referring to FIGS. 5 and 6. The polyline data that is generated is indicative of a polyline in the form of a plurality of points connected by lines. For example, the data may be in the form of an ordered list identifying the points which are connected by the line segments in the polyline. The points may be defined in terms of latitude and longitudinal coordinates. The points may be spaced between 20 and 100 meters apart; so as to optimum processing efficiency. The polyline may take over forms, such a series of connected line segments, or as an ordered list of distances and bearings from a starting location (with each distance and bearing indicating the next line segment of the polyline).

One or more point locations along the track are identified—step 54. The point location(s) are chosen to correspond to points along the track at which it is desirable to include a fuzzy location, to assist in reconstruction of the track. As discussed above, a "fuzzy location" refers to the association of an area with a point location, e.g. as a circle of a certain radius centred on the point location. Thus, while the reconstructed route must pass through the area corresponding to the location, it does not need to pass through the particular point location. There is therefore some latitude in the path taken by the route through the area. The way in which the point location(s) may be selected will be exemplified below. The one or more point locations can be: the origin location of the track; the destination location of the track; a point location that is spaced from a neighbouring point location by more than a predetermined amount, e.g. 1 km; and a point location that is determined to be on a curved portion of the polyline.

In step 56, for each selected point location, an area is defined centred on the point location. The area is a circular area, and has a preset radius, e.g. 1 km. Other shapes and sizes of area may be envisaged. It is also envisaged that a check may be made to determine whether an area of this size includes a suitable portion of the navigable network, and, if not, e.g. if the portion of the network included in the area is not of sufficient size to include at least one outgoing and one incoming navigable segment, the size may be increased until it is sufficient e.g. by increasing the radius in increments of 1 km and checking whether the size of the area is suitable after each increase. Different predetermined radii can be used based on the reason for the selecting the point location. For example, a smaller radius of 600 m may be used for the origin and destination locations.

In step 58, the first polyline is divided into a plurality of second polylines based on the defined areas, such that the track is represented by a series of polylines separated by one or more fuzzy locations, and possibly also beginning and ending with fuzzy locations.

In step 60, the polylines and the or each area defined in relation to a point location along the track are both used to reconstruct the track with respect to the electronic map of the navigation device. Thus, rather than using the polyline data alone, as in the prior art embodiment of FIGS. 5 and 6, the defined areas are additionally used. The route is reconstructed so as to generally conform to the polyline, but is also required to pass through each area defined in relation to the track. It will generally be necessary to identify the polyline and each area in relation to the electronic map, in order to be able to reconstruct the route, as the polyline and each area will generally not be defined in relation to the electronic map, and indeed, may be defined according to a map agnostic system. Generation of the route that reconstructs the polyline, and hence the track with respect to the electronic map, may involve favouring segments in proximity to the polyline when carrying out the route generation process, as described in relation to FIGS. 5 and 6. However, the route is now additionally required to pass through each area defined in relation to the track.

Once the navigation device has reconstructed the track in relation to its own electronic map data, it may use the route in any suitable manner, and may display the route and/or generate a set of navigation instructions to guide a user along the track.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of generating a route reconstructing a track through a navigable network in an area covered by an electronic map, the electronic map comprising a plurality of segments representing navigable elements of the navigable network, the method comprising using at least one processor arranged to:

obtain data indicative of a track through the navigable network to be reconstructed, wherein said data indicative of the track comprises an ordered series of point locations;

select one or more of the point locations, and define a defined area associated with each of the selected one or more point locations;

use the ordered series of point locations and the defined area associated with each of the selected one or more point locations to determine a plurality of poly lines, each polyline being representative of a portion of the track to be reconstructed, so that an entirety of the track is represented by the plurality of poly lines in a series, interspersed with and separated by the defined area associated with each of the selected one or more point locations;

generate, for each polyline of the plurality of poly lines, a first route along segments of the electronic map using a first routing process based on that polyline, wherein the first route provides a reconstruction of the portion of the track represented by that polyline through the navigable network in relation to the electronic map;

generate, for each defined area, a second route along segments of the electronic map using a second routing process, wherein the second route provides a route through the defined area to connect respective first routes, at least one segment of the second route being determined based in part on a relative distance between the at least one segment and a point location with which the defined area is associated; and output for provision to a user at least one of: data indicative of the route reconstructing the track; and a set of navigation instructions for guiding the user along at least a portion of the route reconstructing the track, wherein the route reconstructing the track comprises each first route and each second route.

2. The method of claim 1, wherein the data indicative of the track comprises one of: a recorded track; an itinerary; or a pre-planned route.

3. The method of claim 1, wherein said using the ordered series of point locations and the defined area associated with each of the selected one or more point locations to determine a plurality of polylines comprises:
using the ordered series of point locations to determine a first polyline representative of the track to be reconstructed; and
using the defined area associated with each of the selected one or more point locations to cut the first polyline into a plurality of second polylines, each of the second polylines being representative of a portion of the track to be reconstructed.

4. The method of claim 1, comprising determining a distance between neighbouring point locations, wherein the selected one or more point locations comprise point locations that are spaced from a neighbouring point location by more than a predetermined distance value.

5. The method of claim 1, comprising using the ordered series of point locations to determine at least one curved portion of the track to be reconstructed having a curvature above a predetermined curvature value, wherein the selected one or more point locations comprise at least one point location on the at least one curved portion of the track to be reconstructed.

6. The method of claim 1, further comprising:
defining a defined area associated with one or both of an origin and a destination location of the ordered series of point locations; and
generating, for the defined area associated with the origin and/or destination location, a third route along segments of the electronic map using a third routing process, wherein the third route provides a route through the defined area to a respective first route, at least one segment of the third route being determined based in part on a relative distance between the at least one segment and the one of the origin or destination location with which the defined area is associated,
wherein the route reconstructing the track further comprises each third route.

7. The method of claim 1, wherein the defined area associated with a point location is a circular area centred on the point location having a predetermined radius.

8. The method of claim 1, wherein the first routing process comprises favouring segments of the electronic map for inclusion that are in greater proximity to a respective polyline.

9. The method of claim 8, wherein, when favouring segments, segments that are further from the respective polyline are penalised to a greater degree than segments that are closer to the respective polyline.

10. The method of claim 9, wherein segments are penalised by applying a variable penalty factor thereto depending upon distance of the segment from the respective polyline.

11. A method of generating a route reconstructing a track through a navigable network in an area covered by an electronic map, the electronic map comprising a plurality of segments representing navigable elements of the navigable network, the method comprising using at least one processor arranged to:
obtain data indicative of a track through the navigable network to be reconstructed, wherein said data indicative of the track comprises an ordered series of point locations from an origin location to a destination location;
select one or both of the origin and destination locations, and define a defined area associated with each of the one or both of the origin and destination locations;
use the ordered series of point locations to determine one or more poly lines, each of said one or more poly lines being representative of at least a portion of the track to be reconstructed, so that an entirety of the track is represented by the one or more polylines in a series coupled to the defined area associated with each of the one or both of the origin and destination locations;
generate, for each polyline of the one or more poly lines, a first route along segments of the electronic map using a first routing process based on a respective polyline, wherein the first route provides a reconstruction of the at least a portion of the track represented by the respective polyline through the navigable network in relation to the electronic map;
generate, for the defined area associated with each of the one or both of the origin and destination locations, a second route along segments of the electronic map using a second routing process, wherein the second route provides a route through the defined area to a respective first route, at least one segment of the second route being determined based in part on a relative distance between the at least one segment and the one of the origin and destination locations with which the defined area is associated; and
output for provision to a user at least one of: data indicative of the route reconstructing the track; and a set of navigation instructions for guiding the user along at least a portion of the route reconstructing the track, wherein the route reconstructing the track comprises each first route and each second route.

12. The method of claim 11, wherein the data indicative of the track comprises one of: a recorded track; an itinerary; or a pre-planned route.

13. The method of claim 11, wherein each defined area associated with the one or both of the origin and destination locations is a circular area centred on a corresponding point location having a predetermined radius.

14. The method of claim 11, wherein the first routing process comprises favouring segments of the electronic map for inclusion that are in greater proximity to a respective polyline.

15. The method of claim 14, wherein, when favouring segments, segments that are further from the respective polyline are penalised to a greater degree than segments that are closer to the respective polyline.

16. A computing device for generating a route reconstructing a track through a navigable network in an area covered by an electronic map, the electronic map comprising a plurality of segments representing navigable elements of the navigable network, the computing device comprising at least one processor and a memory, wherein the at least one processor is arranged to:
obtain data indicative of a track through the navigable network to be reconstructed, wherein said data indicative of the track comprises an ordered series of point locations;

select one or more of the point locations, and define a defined area associated with each of the selected one or more point locations;

use the ordered series of point locations and the defined area associated with each of the selected one or more point locations to determine a plurality of poly lines, each polyline being representative of a portion of the track to be reconstructed, so that an entirety of the track is represented by the plurality of poly lines in a series, interspersed with and separated by the defined area associated with each of the selected one or more point locations;

generate, for each polyline of the plurality of poly lines, a first route along segments of the electronic map using a first routing process based on a respective polyline, wherein the first route provides a reconstruction of at least a the portion of the track represented by the respective polyline through the navigable network in relation to the electronic map;

generate, for each defined area, a second route along segments of the electronic map using a second routing process, wherein the second route provides a route through the defined area to connect respective first routes, at least one segment of the second route being determined based in part on a relative distance between the at least one segment and a point location with which the defined area is associated; and output for provision to a user at least one of: data indicative of the route reconstructing the track; and a set of navigation instructions for guiding the user along at least a portion of the route reconstructing the track, wherein the route reconstructing the track comprises each first route and each second route.

17. A computing device for generating a route reconstructing a track through a navigable network in an area covered by an electronic map, the electronic map comprising a plurality of segments representing navigable elements of the navigable network, the computing device comprising at least one processor and a memory, wherein the at least one processor is arranged to:

obtain data indicative of a track through the navigable network to be reconstructed, wherein said data indicative of the track comprises an ordered series of point locations from an origin location to a destination location;

select one or both of the origin and destination locations, and define a defined area associated with each of the one or both of the origin and destination locations;

use the ordered series of point locations to determine one or more poly lines, each of said one or more poly lines being representative of at least a portion of the track to be reconstructed, so that an entirety of the track is represented by the one or more polylines in a series coupled to the defined area associated with each of the one or both of the origin and destination locations;

generate, for each polyline of the one or more poly lines, a first route along segments of the electronic map using a first routing process based on a respective polyline, wherein the first route provides a reconstruction of the at least a portion of the track represented by the respective polyline through the navigable network in relation to the electronic map;

generate, for the defined area associated with each of the one or both of the origin and destination locations, a second route along segments of the electronic map using a second routing process, wherein the second route provides a route through the defined area to a respective first route, at least one segment of the second route being determined based in part on a relative distance between the at least one segment and the one of the origin and destination locations with which the defined area is associated; and output for provision to a user at least one of: data indicative of the route reconstructing the track; and a set of navigation instructions for guiding the user along at least a portion of the route reconstructing the track, wherein the route reconstructing the track comprises each first route and each second route.

18. A non-transitory computer readable medium comprising instructions which, when executed by at least one processor of a computing device, cause the computing device to operate according to the method of claim 1.

19. A non-transitory computer readable medium comprising instructions which, when executed by at least one processor of a computing device, cause the computing device to operate according to the method of claim claim 11.

* * * * *